United States Patent
Takami et al.

(10) Patent No.: US 7,434,641 B2
(45) Date of Patent: Oct. 14, 2008

(54) CONTROL APPARATUS OF HYBRID VEHICLE

(75) Inventors: Shigeki Takami, Anjo (JP); Kiyotomo Miura, Anjo (JP); Satoru Wakuta, Anjo (JP); Tatsuya Ozeki, Toyota (JP); Hiroatsu Endo, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 331 days.

(21) Appl. No.: 10/946,098

(22) Filed: Sep. 22, 2004

(65) Prior Publication Data

US 2005/0103544 A1    May 19, 2005

(30) Foreign Application Priority Data

Sep. 24, 2003    (JP) ............... 2003-331987

(51) Int. Cl.
*B60L 11/02*    (2006.01)
*B60K 1/02*    (2006.01)

(52) U.S. Cl. ............ 180/65.4; 180/65.2; 180/65.3; 701/22

(58) Field of Classification Search ............ 180/65.2–4, 180/65.6–8; 903/903, 941, 943, 945; 123/319, 123/395, 399; 701/22; 290/40 R, 40 F
See application file for complete search history.

(56) References Cited

U.S. PATENT DOCUMENTS

| | | | |
|---|---|---|---|
| 3,623,568 A | | 11/1971 | Mori |
| 5,844,342 A | * | 12/1998 | Miyatani et al. ............ 310/114 |
| 5,959,420 A | * | 9/1999 | Boberg et al. ............ 318/432 |
| 6,005,297 A | * | 12/1999 | Sasaki et al. ............ 290/4 C |
| 6,053,833 A | * | 4/2000 | Masaki ............ 475/2 |
| 6,173,574 B1 | * | 1/2001 | Obayashi et al. ............ 60/710 |
| 6,299,563 B1 | * | 10/2001 | Shimasaki ............ 477/5 |
| 6,356,817 B1 | * | 3/2002 | Abe ............ 701/22 |

(Continued)

FOREIGN PATENT DOCUMENTS

JP    47-31773    8/1972

(Continued)

OTHER PUBLICATIONS

U.S. Appl. No. 10/855,371, May 28, 2004, Nakamori et al.

(Continued)

*Primary Examiner*—Christopher Ellis
*Assistant Examiner*—Vaughn T Coolman
(74) *Attorney, Agent, or Firm*—Oliff & Berridge, PLC

(57) ABSTRACT

A control apparatus of a hybrid vehicle having a first drive unit, a second drive unit, a HV battery, a shift control element, a battery state detection element, and a shifting-time drive control element. Furthermore, in the control apparatus, a battery balance control element is formed by an engine control element, a first motor control element, a second motor control element and the shifting-time drive control element. If the shift control element determines there is a need for shifting carried out by a stepped transmission, the battery balance control element calculates the amount of increase/decrease in the amount of charge of the HV battery in accordance with the state of the HV battery, and changes the engine operation point on the basis of the calculated amount of increase/decrease in the battery charge, prior to the shifting.

27 Claims, 7 Drawing Sheets

U.S. PATENT DOCUMENTS

| | | |
|---|---|---|
| 6,595,895 B2 * | 7/2003 | Suzuki et al. .................. 477/3 |
| 6,629,026 B1 * | 9/2003 | Baraszu et al. ................ 701/22 |
| 6,847,189 B2 * | 1/2005 | Frank ......................... 320/104 |
| 6,994,177 B2 * | 2/2006 | Ito et al. .................... 180/65.2 |
| 7,223,200 B2 * | 5/2007 | Kojima et al. .................. 477/3 |
| 2002/0016660 A1 * | 2/2002 | Suzuki et al. ................. 701/62 |
| 2002/0079148 A1 * | 6/2002 | Aoki et al. ................. 180/65.2 |
| 2003/0064854 A1 | 4/2003 | Kotani |
| 2004/0084233 A1 | 5/2004 | Wakuta et al. |
| 2004/0259680 A1 | 12/2004 | Ozeki et al. |

FOREIGN PATENT DOCUMENTS

| | | |
|---|---|---|
| JP | A 8-207601 | 8/1996 |
| JP | A 2002-225578 | 8/2002 |
| JP | A-2003-130203 | 5/2003 |

OTHER PUBLICATIONS

U.S. Appl. No. 10/890,454, Jul. 14, 2004, Takami et al.

* cited by examiner

CONTROL APPARATUS OF HYBRID VEHICLE

CROSS-REFERENCE TO RELATED APPLICATION

The disclosure of Japanese Patent Application No. 2003-331987 filed on Sep. 24, 2003 including the specification, drawings and abstract is incorporated herein by reference in its entirety.

BACKGROUND OF THE INVENTION

1. Field of Invention

The invention relates to a control apparatus of a hybrid vehicle equipped with two different drive units that supply driving force to a driving wheel side. More particularly, the invention relates to a control apparatus of a hybrid vehicle capable of preventing fluctuations in the output at the time of shifting carried out by a stepped transmission that is provided in one of the two drive units.

2. Description of Related Art

In recent years, various types of hybrid vehicles have been proposed in an attempt to improve fuel economy in view of adverse environmental effects and the like. Among such hybrid vehicles, a two-motor split type hybrid vehicle (see, e.g., Japanese Patent Application Laid-Open Publication No. 8-207601) has been proposed in which a rotating element of a planetary gear is connected to an output shaft of an internal combustion engine, and the other two rotating elements of the planetary gear are connected to a first electric motor and to a transfer shaft connected to driving wheels, and a second electric motor is connected to the transfer shaft.

In this hybrid vehicle, the first electric motor mainly receives a portion of the driving force of the engine and thereby generates electricity and simultaneously generates a reaction force on the rotating element of the planetary gear. The rest of the driving force of the engine is output to the transfer shaft via the rotating element on which the reaction force is generated by the first electric motor. Furthermore, a driving force of the second electric motor can be output to the transfer shaft. That is, the rotation of the engine can be controlled in a continuous or stepless fashion by controlling the first electric motor, so that the engine can be driven in a region of good efficiency. Additionally, the output to the driving wheels can be controlled via the second electric motor. Thus, on the basis of flexible control of the first electric motor and the second electric motor, the engine can be efficiently driven, and a driving force can be output to the driving wheels in response to a requested output from the driver.

In the above-described conventional hybrid vehicle (as found in Japanese Patent Application Laid-Open Publication No. 8-207601), the second electric motor is operated in association with the driving wheels. That is, the rotation of the second electric motor is increased as the vehicle speed increases. Generally, in a high rotation speed region of an electric motor, the output (torque) of the electric motor decreases in accordance with the rotation speed thereof. For example, when the vehicle is running in an intermediate-to-high speed region, the output of the second electric motor decreases as the rotation speed of the second electric motor becomes high. Further, in the case of vehicles that need great output power (e.g., vehicles having an engine displacement of 3000 cc, 4000 cc or the like), it is required that the capacity (output) of the second electric motor be large. In order to meet a request for great output in a high rotation speed region, a size increase in the second electric motor is needed, thus giving rise to a problem of impairment of easy installation into a vehicle.

SUMMARY OF THE INVENTION

In order to solve the aforementioned problem, it is conceivable to provide a stepped transmission between the second electric motor and the transfer shaft. For example, if the rotation speed of the second electric motor can be shifted corresponding to a low-to-intermediate vehicle speed region and an intermediate-to-high vehicle speed region, it becomes possible to use the second electric motor at low rotation speeds, so that the second electric motor can be of a compact size and therefore installability of the second electric motor in the vehicle will improve.

However, mere execution of speed shifting by the stepped transmission brings about a stepwise change between the pre-shift and post-shift outputs of the second electric motor. For example, even if the share of the output of the engine, of the first electric motor and the second electric motor, are determined so as to achieve a driver request output after the shifting, and if the outputs thereof are accordingly re-controlled, there is a possibility that a temporary torque fluctuation, failing to meet the driver request torque, will occur during the shifting, and will discomfort the driver.

In order to reduce the discomfort, it is conceivable to increase or reduce the torque of the second electric motor during the shifting. In such a case, however, it may become difficult to appropriately carry out electric power supply and storage of regenerative power due to a state of charge (SOC) of a battery that supplies power and stores regenerative power in conjunction with the second electric motor. Thus, there is the possibility of the occurrence of a situation where an appropriate power supply to the second electric motor is not carried out. Therefore, the driving force of the second electric motor needed in order to offset torque fluctuations at the time of the shifting executed by the stepped transmission is not attained.

Accordingly, it is an object of the invention to provide a control apparatus of a hybrid vehicle which shifts the electric motor output stepwise via a stepped transmission, combines the electric motor output with an engine output, and transfers the combined output to a driving wheel side. The control apparatus is designed to be able to always stably supply an output needed in order to offset torque fluctuations at the time of the shifting of the stepped transmission so as to eliminate or minimize the output fluctuation at the driving wheel side, at the time of the shifting, by relaxing the restrictions on the output increase/decrease amount imposed due to the battery performance and the like, and which thereby solves the aforementioned problems of the related art.

In a control apparatus of a hybrid vehicle according to a first exemplary aspect of the invention, if it is determined that there is a need for shifting carried out by a stepped transmission, battery balance control means calculates an amount of increase/decrease in the amount of charge of a battery in accordance with a state of the battery, and changes an operation point of an engine based on the amount of increase/decrease in the amount of charge, prior to the shifting of the stepped transmission. Therefore, on the side of a second drive unit, the supply of electric power to a second electric motor is always appropriately performed, regardless of the state of charge of the battery, so that sufficient amount of driving force of the second electric motor is attained to avoid torque fluctuation at the time of the shifting of the stepped transmission. On the side of a first drive unit, a first electric motor can be appropriately operated within an allowable range of the amount of battery charge in conjunction with the supplied electric power or the regenerated electric power, due to the engine driven on the basis of the engine operation point changed on the basis of the amount of increase/decrease in the battery charge. Therefore, it becomes possible to minimize the output fluctuations on the driving wheel side at the time of shifting the transmission speed.

According to a second exemplary aspect of the invention, in changing the operation point of the engine, the battery balance control means executes such a control as to change the engine torque without changing the engine rotation speed. Therefore, if the engine torque that achieves the calculated amount of charge without involving a change in the engine rotation speed is determined through calculation alone or using an engine efficiency map Ma (see FIG. 6), the changing of the engine operation point from, for example, a point A to a point D in FIG. 6, can be appropriately performed. Therefore, the first electric motor can be appropriately operated within an allowable range of the amount of charge in connection with the supplied power or the regenerated power.

According to a third exemplary aspect of the invention, in changing the operation point of the engine, the battery balance control means executes such a control as to change the engine rotation speed without changing the engine torque. Therefore, if the engine rotation speed that achieves the calculated amount of charge without involving a change in the engine torque is determined through calculation alone or using the engine efficiency map Ma (FIG. 6), the changing of the engine operation point from, for example, the point A to a point E in FIG. 6, can be appropriately performed. Therefore, the first electric motor can be appropriately operated within an allowable range of the amount of charge in connection with the supplied power or the regenerated power.

According to a fourth exemplary aspect of the invention, an engine efficiency map is provided in which operation points of the engine are pre-set so as to achieve a best fuel economy (optimal fuel economy) for each of various rotation speeds of the engine, and the battery balance control means executes such a control as to change the operation point of the engine to a point on a best fuel economy line. Therefore, if, using the engine efficiency map Ma (FIG. 6), the points of intersection of the best fuel economy line L and constant-engine power lines $Ch_1$, $Ch_2$ for achieving the calculated amount of increase/decrease in the battery charge are determined, the engine operation point can be appropriately changed from the point A to a point B. Therefore, by executing a control on the best fuel economy line L in the engine efficiency map Ma or in the vicinity of the best fuel economy line L, the first electric motor can be appropriately operated within an allowable range of the amount of charge in connection with the supplied power or the regenerated power.

According to a fifth exemplary aspect of the invention, the battery balance control means executes such a returning control so as to resume a torque of the first electric motor and a torque of the engine corresponding to the operation point of the engine set prior to the shifting based on the state of the battery after the shifting of the stepped transmission has ended. Therefore, the engine torque and the first motor torque, whose balance has changed during the shifting, are quickly returned to the values occurring prior to the shifting. For example, the engine torque increased during the shifting is promptly reduced to curb fuel consumption, so that the fuel economy will improve.

According to a sixth exemplary aspect of the invention, the battery balance control means calculates an electric power consumption that is needed for the shifting to be performed, and determines whether it is possible to output the electric power consumption from the battery. If it is determined that it is possible to output the amount of electric power from the battery, the battery balance control means avoids a change of the operation point of the engine. If it is determined that that it is impossible to output the amount of electric power from the battery, the battery balance control means executes such a control as to change the operation point of the engine. Therefore, the control apparatus is able to execute an always appropriate control in accordance with the state of the battery.

BRIEF DESCRIPTION OF THE DRAWINGS

This invention will be described with reference to the drawings, in which.

DETAILED DESCRIPTION OF PREFERRED EMBODIMENT

An exemplary embodiment of the invention will be described hereinafter with reference to FIGS. 1 to 6.

Figure 1:
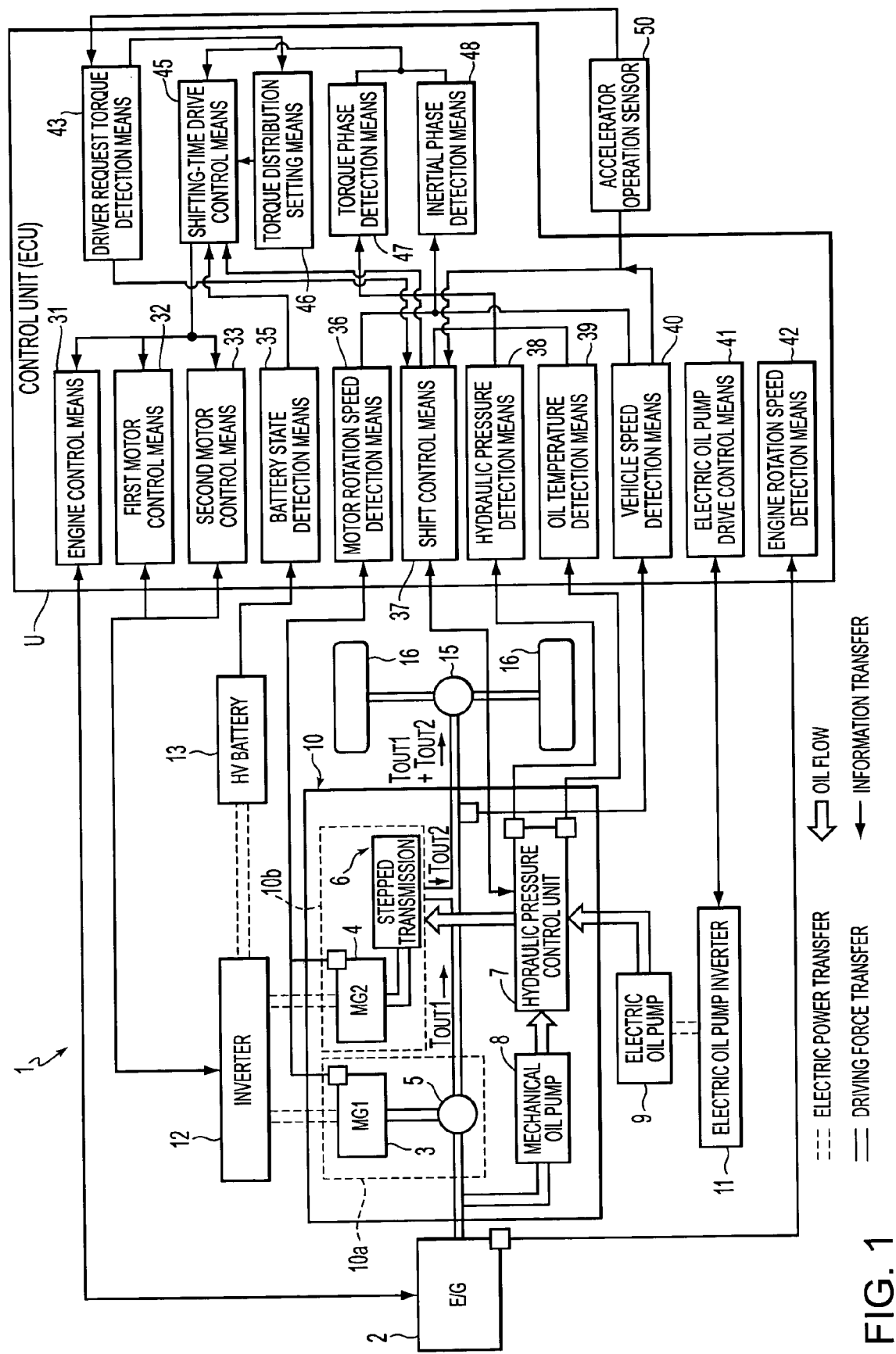
FIG. 1 is a schematic block diagram illustrating a control apparatus of a hybrid vehicle according to an exemplary embodiment of the invention.

Firstly, an example of the hybrid vehicle to which the invention is applicable will be described with reference to FIGS. 1, 2A and 2B. As shown in FIG. 1, the hybrid vehicle is a two-motor split type hybrid vehicle. The hybrid vehicle includes an internal combustion engine (E/G) 2 capable of outputting a driving force, a drive unit 10 connected to the engine 2, and driving wheels (rear wheels) 16 connected to the drive unit 10 via a differential device 15.

The drive unit 10 includes a first drive unit 10a and a second drive unit 10b for outputting the driving force to the driving wheels 16. The first drive unit 10a includes a power distribution planetary gear 5 connected to the engine 2 via a damper device or the like (not shown), and a first electric motor (MG1) 3 connected to the power distribution planetary gear 5. The first drive unit 10a is connected to a transfer shaft 21 via the power distribution planetary gear 5. The second drive unit 10b has a second electric motor (MG2) 4 and a stepped transmission 6 interposed between the second motor 4 and the transfer shaft 21. Thus, the second drive unit 10b is connected to the transfer shaft 21 via the stepped transmission 6. Each of the first motor 3 and the second motor 4 may be structured as a motor-generator that is formed by, for example, an AC synchronous motor.

As shown in FIG. 2A, an input shaft 17 of the drive unit 10 is connected to a crankshaft 2a of the engine 2 via a damper device (not shown) or the like. A carrier CR1 of the power distribution planetary gear 5, which is a simple planetary gear, is connected to the input shaft 17 via a hub member 18. The carrier CR1 is provided with pinions P1 that are rotatably supported by a side plate (not shown). A sun gear S1 meshing with the pinions P1 is connected to a rotor shaft 19 of the first motor 3. Furthermore, a ring gear R1 is provided in mesh with the pinions P1. A drum-shaped support member 20 is connected to the ring gear R1. The ring gear R1 is connected to the transfer shaft 21 via the support member 20.

Figure 2:
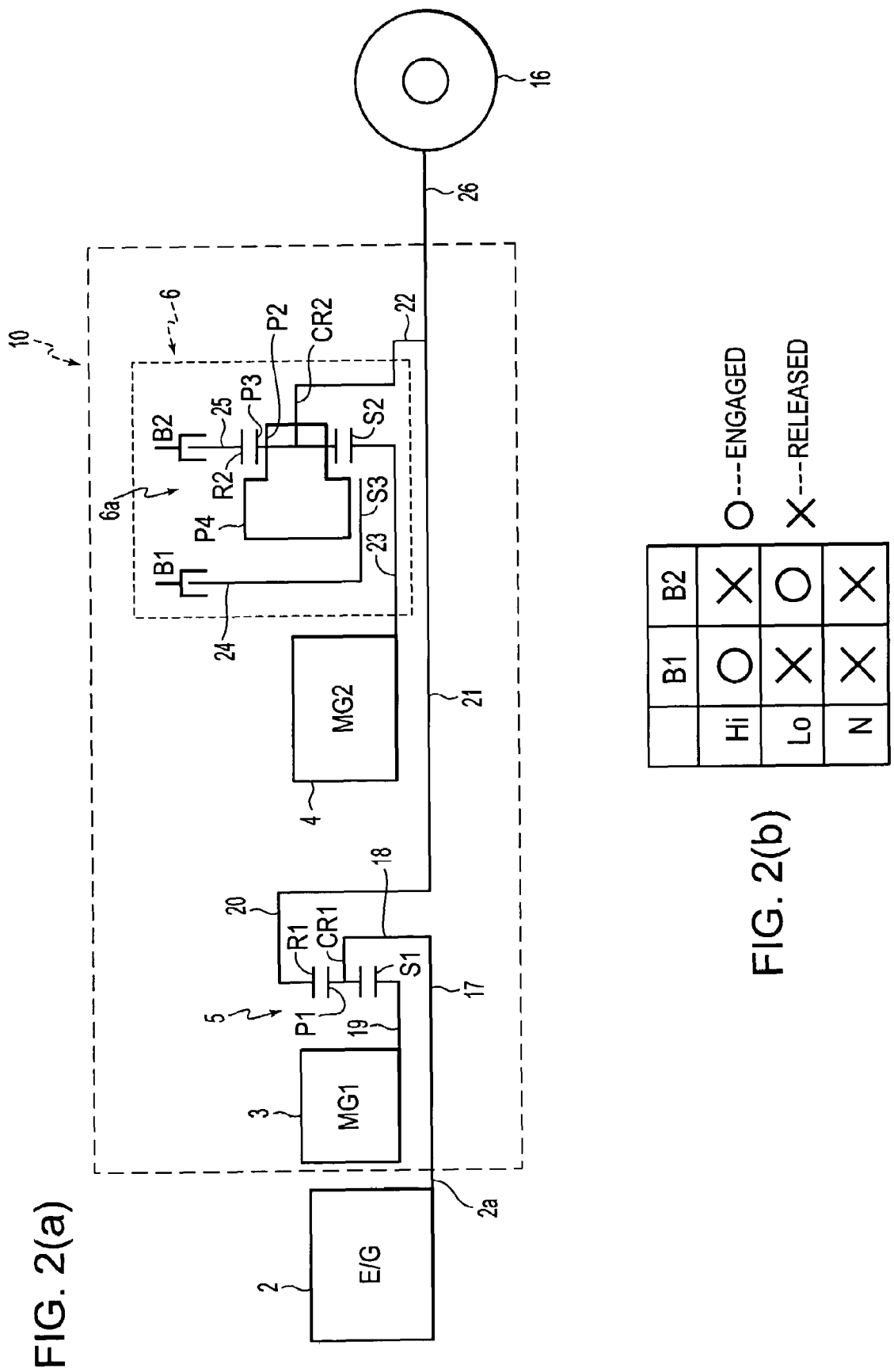
FIG. 2(a) is a schematic diagram illustrating a drive train of the hybrid vehicle.
FIG. 2(b) is a table of engagement of brakes of a transmission in the drive train illustrated in FIG. 2(a)

The stepped transmission 6, that includes a planetary gear unit 6a, is connected to a rear end side of the transfer shaft 21 (a rightward side in FIG. 2). Specifically, a carrier CR2 of the planetary gear unit 6a is connected to the transfer shaft 21 via a hub member 22. The carrier CR2 has long pinions P2, P4 (each long pinion P2, P4 has small-diameter portion P2 and a large-diameter portion P4 which are integrally formed together) and short pinions P3 (hereinafter, simply referred to as "pinions P3") that are rotatably supported by a side plate (not shown). The small-diameter pinion portions P2 are in mesh with the pinions P3.

A sun gear S2 meshes with the pinions P3. The sun gear S2 is connected to a rotor shaft 23 of the second motor 4. A sun gear S3 meshes with the large diameter pinion portions P4. A hub member 24 is connected to the sun gear S3. The hub member 24 is spline-engaged with a friction plate of a first brake B1, that is a multi-disc type brake. The first brake B1 can be suitably engaged by supplying hydraulic pressure to a hydraulic servo (not shown).

A ring gear R2 meshes with the pinions P3. A hub member 25 is connected to the ring gear R2. The hub member 25 is spline-engaged with a friction plate of a second brake B2, that is a multi-disc type brake. The second brake B2 can be suitably engaged by supplying hydraulic pressure to a hydraulic servo (not shown).

The transfer shaft 21 is connected to an output shaft 26 of the drive unit 10. The output shaft 26 is connected to the differential device 15 (FIG. 1) via a coupling (not shown), a propeller shaft (not shown), etc. The connection is further extended to the driving wheels 16 via right and left-side drive shafts (FIG. 1).

As shown in FIG. 1, the input shaft 17 (or the crankshaft 2a of the engine 2) is connected to the drive unit 10 (FIG. 2A). The drive unit 10 includes a mechanical oil pump 8 that is operated in association with the engine 2, and a hydraulic pressure control unit 7. When hydraulic pressure is supplied from the mechanical oil pump 8 to the hydraulic pressure control unit 7, the hydraulic pressure control unit 7 can supply lubricant oil, coolant oil, and hydraulic pressure for the two hydraulic pressure servos for brakes B1, B2 of the stepped transmission 6 and the second motor 4.

The hybrid vehicle has an electric oil pump 9 that is operated separately from and independently of the mechanical oil pump 8. The electric oil pump 9 is suitably driven by electric power supplied from an electric oil pump inverter 11. The inverter 11 is controlled by electric oil pump control means 41 described later. When the engine 2 is in a stopped state, for example, when at a stop and the engine cuts off, the mechanical oil pump 8 which cooperates with the engine 2 is also stopped. Therefore, the electric oil pump 9 is mainly driven during a stopped state of the mechanical oil pump 8 so as to provide hydraulic pressure for the hydraulic pressure control unit 7.

Further, the hybrid vehicle has an inverter 12, and a HV battery (battery for hybrid drive) 13 connected to the inverter 12. The inverter 12 is connected to the first motor 3 and the second motor 4. The inverter 12 is controlled by first motor control means 32 and second motor control means 33, described later. The inverter 12 suitably drives the first motor 3 and the second motor 4 so that regenerative operation or power assist is performed. At this time, the electric power generated by the regenerative motor operation is suitably charged into the HV battery 13, or the motor-driving electric power is suitably supplied from the HV battery 13.

The driving force transfer in the above-described hybrid vehicle will be described with reference to FIGS. 1, 2(*a*) and 2(*b*). As shown in FIG. 2(*a*), a torque $T_E$ (hereinafter also referred to as the "engine torque" (FIG. 4)) is output from the engine 2 as a driving force. The torque $T_E$ is input to the carrier CR1, of the power distribution planetary gear 5, through the crankshaft 2a, the input shaft 17 and the hub member 18. On the other hand, as a result of control of a torque $T_{MG1}$ (FIG. 4) of the first motor 3 (hereinafter also referred to as the "first motor torque"), part of the engine torque $T_E$ is distributed to the first motor 3, and the torque $T_{MG1}$ of the first motor 3 is transferred (through the rotor shaft 19 and the sun gear S1) as a reaction force that opposes the engine torque $T_E$. The reaction force of the sun gear S1 causes the ring gear R1 to rotate, and the rest of the torque of the engine torque $T_E$ is distributed, that is, a driving force (hereinafter also referred to as the "first drive torque") $T_{OUT1}$ is output from the first drive unit 10a to the transfer shaft 21 (FIGS. 1 and 2(*a*)).

When, in response to a signal from shift control means (shift determination means) 37 described later, the hydraulic pressure control unit 7 supplies hydraulic pressure to the hydraulic servo of the first brake B1 of the stepped transmission 6 or the hydraulic servo of the second brake B2 of the stepped transmission 6, the first brake B1 or the second brake B2 is engaged, so that the stepped transmission 6 undergoes shifting. That is, as shown in FIGS. 2(*a*) and 2(*b*), when the first brake B1 is engaged and the second brake B2 is released, rotation of the sun gear S3 is stopped by the first brake B1. Accordingly, as the sun gear S3 is stopped from rotating and the sun gear S2 is rotating at the rotation speed $N_{MG2}$ of the second motor 4 (see FIG. 4), the stepped transmission 6 assumes a high-speed state (Hi) where the carrier CR2 rotates at a high speed.

Furthermore, when the second brake B2 is engaged and the first brake B1 is released, as indicated in FIGS. 2(*a*) and 2(*b*), rotation of the ring gear R2 is stopped by the first brake B1. Accordingly, as the ring gear R2 is stopped from rotating and the sun gear S2 is rotating at the rotation speed $N_{MG2}$ of the second motor 4 (see FIG. 4), the stepped transmission 6 assumes a low-speed state (Lo) where the carrier CR2 rotates at low speed.

When both the first and second brakes B1, B2 are released, both the sun gear S3 ad the ring gear R2 rotate idly, and therefore the stepped transmission 6 assumes a neutral state (N) where the rotation of the sun gear S2, that is, the rotation $N_{MG2}$ (see FIG. 4) of the second motor 4, and the rotation of the carrier CR2 are not connected together.

If a torque of the second motor 4 (hereinafter also referred to as "second motor torque") $T_{MG2}$ (see FIG. 4) is output, the torque $T_{MG2}$ is transferred to the sun gear S2 through the rotor shaft 23. At this time, if the low speed stage (Lo) has been selected in the stepped transmission 6, the $T_{MG2}$ is converted into a relatively large torque. If the high speed stage (Hi) has been selected in the stepped transmission 6, the torque $T_{MG2}$ is converted into a relatively small torque. The thus-converted torque is output to the carrier CR2 and the hub member 22. That is, a driving force output from the second drive unit 10b (hereinafter referred to as "second drive torque") $T_{OUT2}$ is output to the transfer shaft 21 (see FIG. 1).

As indicated in FIG. 1, when the first drive torque $T_{OUT1}$ from the first drive unit 10*a* and the second drive torque $T_{OUT2}$ from the second drive unit 10*b* are output to the transfer shaft 21, the total output torque $T_{OUT1}+T_{OUT2}$ (driving force to be output to the driving wheels) is output from the output shaft 26 of the drive unit 10. The total output torque is then transferred to the differential device 15 via a coupling (not shown), a propeller shaft (not shown), or the like, and then is output from the differential device 15 to the driving wheels 16 via the right and left drive shafts.

Next, a control apparatus 1 of the hybrid vehicle in accordance with the exemplary embodiment will be described with reference to FIG. 1. The control apparatus 1 of the hybrid vehicle has a control unit (ECU) U. The control unit U includes engine control means 31, first motor control means 32, second motor control means 33, battery state detection means 35, motor rotation speed detection means 36, shift control means 37, hydraulic pressure detection means 38, oil temperature detection means 39, vehicle speed detection means 40, electric oil pump drive control means 41, engine rotation speed detection means 42, driver request torque detection means 43, shifting-time drive control means 45, torque distribution setting means 46, torque phase detection means 47, and inertial phase detection means 48.

The engine control means 31 is connected to the engine 2. The driving force of the engine 2, i.e., the engine torque $T_E$, can be suitably controlled by suitably changing the degree of throttle opening or the fuel injection amount of the engine 2.

The first motor control means 32 is connected to the inverter 12 to control the inverter 12. By controlling the inverter 12, the first motor control means 32 suitably controls the supply of electric power, from the HV battery 13, for driving the first motor 3, and the storage of electric power regenerated by the first motor 3 into the HV battery 13, and thereby suitably controls the driving force of the first motor 3, that is, the first motor torque $T_{MG1}$. Similarly, the second motor control means 33 is connected to the inverter 12. By controlling the inverter 12, the second motor control means 33 suitably controls the supply of electric power, from the HV battery 13, for driving the second motor 4, and the storage of electric power regenerated by the second motor 4 into the HV battery 13, and thereby suitably controls the driving force of the second motor 4, that is, the second motor torque $T_{MG2}$.

The battery state detection means 35 is connected to the HV battery 13 for detecting the voltage and the current of the HV battery 13. Further, on the basis of the detected voltage and current, the battery state detection means 35 detects the state of charge (SOC) of the HV battery 13, and various other states of the HV battery 13, such as the state of health of the HV battery 13, the temperature thereof, etc. The state of health of the battery can be detected based on, for example, a voltage drop.

Further, the battery state detection means 35 detects the SOC, for example, through integration of the current during a steady run of the vehicle, and on the basis of I-V characteristics data of the current and the voltage, or the like, during an idling stop state where the engine is stopped during a vehicular stop for a traffic signal or the like. Moreover, the battery state detection means 35 can detect the torque which can be output by the first motor 3 and the second motor 4 on the basis of the SOC and various other states as mentioned above, and the rotation speed detected by the motor rotation detection means 36. The motor rotation detection means 36 is connected to rotation speed sensors (not shown) that are provided separately for the first motor 3 and the second motor 4. On the basis of results of detection carried out by the rotation speed sensors, the motor rotation detection means 36 detects the rotation speeds of the first motor 3 and the second motor 4.

The shift control means 37 is connected to, for example, a linear solenoid valve (not shown) for the first brake B1 and a linear solenoid valve (not shown) for the second brake B2 which are provided in the hydraulic pressure control unit 7. The shift control means 37 controls the linear solenoid valves so as to control the hydraulic pressures of a hydraulic servo (not shown) of the first brake B1 and of a hydraulic servo (not shown) of the second brake B2. Accordingly, the shift control means 37 is able to execute suitable control of (a) forming the high speed stage (Hi), the low speed stage (Lo), or the neutral state (N) of the stepped transmission 6, and (b) performing the engagement switch-over between the first brake B1 and the second brake B2.

When a torque requested by a driver is detected by the driver request torque detection means 43, the shift control means 37 determines whether shifting is necessary based on a vehicle speed detected by the vehicle speed detection means 40, and the degree of accelerator operation detected on the basis of a detection carried out by an accelerator operation sensor 50, provided in the vicinity of a driver's seat (not shown). The determination result is transmitted to the shifting-time drive control means 45. Namely, the shift control means 37 forms shift determination means for determining whether shifting of the stepped transmission 6 is necessary, on the basis of the driver request torque and the running state of the vehicle. Examples of conditions for determining the driver request torque include the vehicle speed and the degree of accelerator operation.

The shift control means 37 can operate in different shift determination modes, that is, a shift determination mode for actually performing shifting, and a preliminary shift determination mode for making a preliminary shift determination prior to the shift determination in the shift determination mode. The operations in the shift determination mode and the preliminary shift determination mode are carried out according to a shift map shown in FIG. 5. It is assumed that the shift control means 37 uses the degree of accelerator operation and the vehicle speed as predetermined conditions for making the shift determinations. If it is determined that the driver is requesting a relatively rapid acceleration based on rapid change in the degree of accelerator operation (i.e., the degree of accelerator pedal depression, or the like), shifting needs to be carried out swiftly. In that case, therefore, the shift control means 37 executes the shift determination in the shift determination mode instead of the preliminary shift determination mode, and transmits the results of the determination to the shifting-time drive control means 45. When the change in the degree of accelerator operation is relatively gentle and it is determined that the driver is not requesting rapid acceleration, the shift control means 37 makes a preliminary shift determination in the preliminary shift determination mode before the shift determination is executed in the shift determination mode. The shift control means 37 transmits results of shift determination to the shifting-time drive control means 45.

For example, if the change in the degree of accelerator operation is very rapid, for example, at the time of kickdown in an automatic transmission (AT) vehicle, the shift control means 37 does not enter either of the two shift determination modes, but immediately outputs a command to execute shift control to the shifting-time drive control means 45. At this time, if the change in the degree of accelerator operation, which is a condition for determining the driver request torque, is equal to or greater than a predetermined threshold value, the shifting-time drive control means 45 controls the engine control means 31, the first motor control means 32, and the second motor control means 33 so as to prohibit: (a) increase in the output torque of the first drive unit 10a, and (b) a decrease in the output torque of the second drive unit 10b. Thus, when it is determined that rapid acceleration is requested by the driver, shifting is quickly carried out to immediately meet the driver's request.

The shift control means 37 may use various determination methods for the shift determination. Examples of the determination methods include a method that uses the rate of change in the degree of accelerator operation, a method that uses the driver request torque, etc. If the rate of change in the degree of accelerator operation or the rate of change in the driver request torque is equal to or greater than a respective threshold value, it is determined that a relatively fast acceleration is requested. Conversely, if the rate of change in the degree of accelerator operation or the rate of change in the driver request torque is less than the threshold value, it is determined that a relatively slow acceleration is requested.

The shift determinations of the shift control means 37 are made based on the relationship between a requested output of the second motor 4 which is determined based on the degree of accelerator operation, and the present rotation speed $N_{MG2}$ of the second motor 4. For example, if the rotation speed $N_{MG2}$ has increased, the shift control means 37 determines that upshifting from the low speed stage to the high speed stage needs to be performed. If the rotation speed $N_{MG2}$ has decreased, the shift control means 37 determines that downshifting from the high speed stage to the low speed stage needs to be performed. Further, if the requested torque of the second motor 4 is decreased, the shift control means 37 determines that upshifting from the low speed stage to the high speed stage needs to be performed. If the requested torque of the second motor 4 is increased, the shift control means 37 determines that downshifting from the high speed stage to the low speed stage needs to be performed. On the basis of the determination, the shift control means 37 controls the shifting of the stepped transmission 6.

The hydraulic pressure detection means 38 is connected to the hydraulic pressure control unit 7, and detects, for example, the hydraulic pressure supplied to the hydraulic servo of the first brake B1 from the linear solenoid valve for the first brake B1, and the hydraulic pressure supplied to the hydraulic servo of the second brake B2 from the linear solenoid valve for the second brake B2. Further, the oil temperature detection means 39 detects the oil temperature in the hydraulic pressure control unit 7. On the basis of the hydraulic pressures detected by the hydraulic pressure detection means 38 and the oil temperature detected by the oil temperature detection means 39, it is possible to detect (calculate) the respective positions of pistons (not shown) of the hydraulic servos of the first and second brakes B1, B2. Thus, the states of engagement of the first and second brakes B1, B2 can be detected.

The vehicle speed detection means 40 is connected to, for example, a rotation speed sensor (not shown) that is provided at the output shaft 26 of the drive unit 10. The vehicle speed detection means 40 detects the vehicle speed based on the rotation speed of the output shaft 26.

The electric oil pump drive control means 41 is connected to the electric oil pump inverter 11. The electric oil pump drive control means 41 controls the inverter 11 so as to control the power supply to the electric oil pump 9 from a battery (not shown) and thereby suitably controls the driving of the electric oil pump 9. When the engine rotation detection means 42 detects the engine rotation speed NE has decreased to or below a predetermined speed, the electric oil pump drive control means 41 drives the electric oil pump 9 to supply hydraulic pressure to the hydraulic pressure control unit 7 and thereby secure at least a predetermined hydraulic pressure. In this manner, it is possible to avoid an incident where a reduction in the hydraulic pressure of the mechanical oil pump 8 results in a failure to maintain at least a predetermined level of hydraulic pressure.

The engine rotation detection means 42 is connected to, for example, a rotation speed sensor (not shown) provided at the crankshaft 2a of the engine 2, and detects the engine rotation speed NE of the engine 2.

The driver request torque detection means 43 is connected to, for example, the accelerator operation sensor 50 that detects the degree of accelerator operation and, more specifically, the amount of operation (depression) of an accelerator pedal or the like provided in the vicinity of the driver's seat (not shown). The driver request torque detection means 43 detects (calculates) the torque (driving force) requested by the driver, on the basis of the amount of operation of the accelerator pedal or the like, and the vehicle speed detected by the vehicle speed detection means 40.

Figure 6:
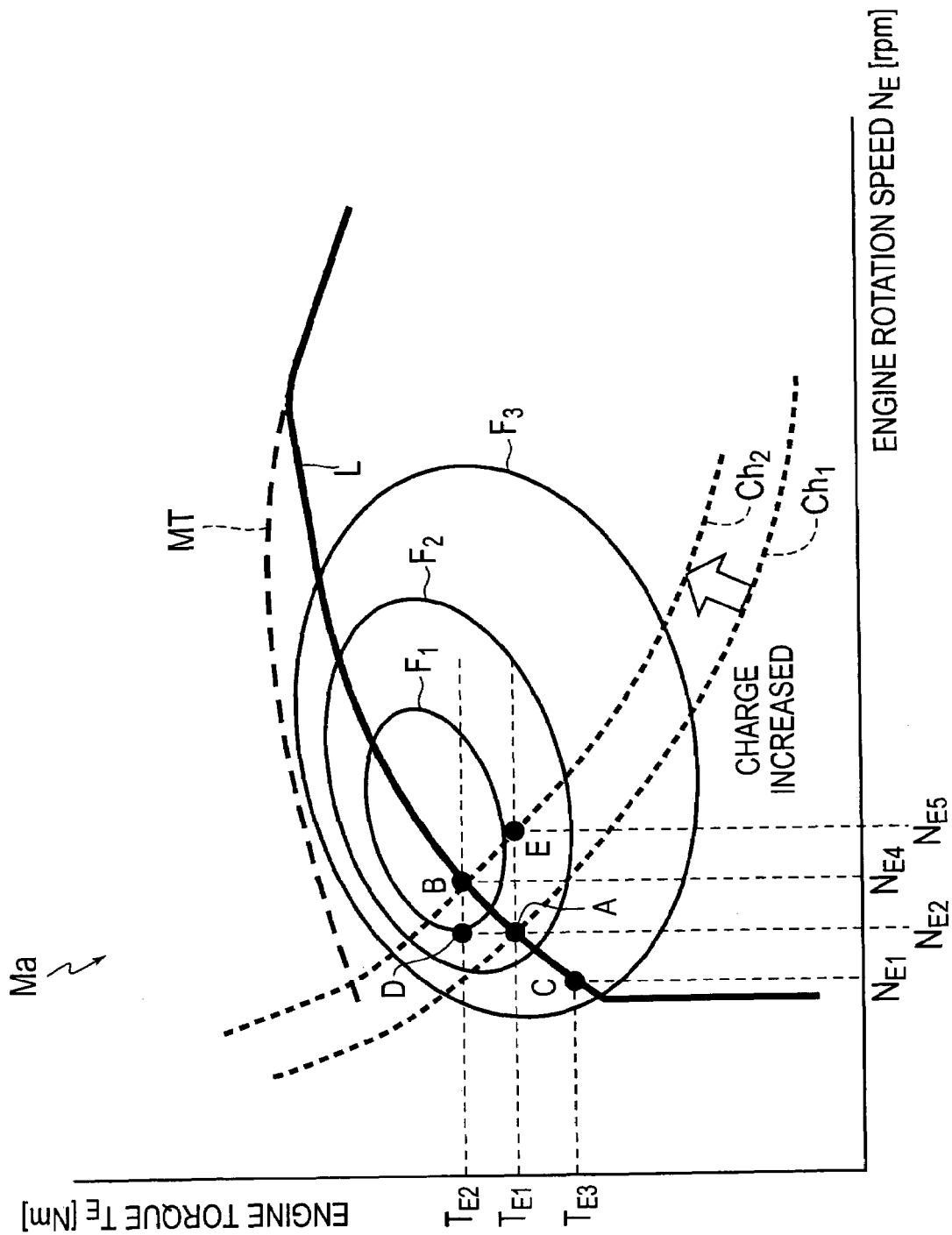
FIG. 6 shows an example of an engine efficiency map.

If the shift control means 37 determines that shifting is needed, the shifting-time drive control means 45, prior to the shifting of the stepped transmission 6, calculates the amount of increase or decrease in the charge of the HV battery 13 in accordance with the state of the HV battery 13 (i.e., in accordance with results of detection regarding various states of the HV battery 13, such as the SOC thereof, detected by the battery state detection means 35, etc.). On the basis of the calculated amount of increase or decrease in the battery charge, the shifting-time drive control means 45 outputs commands to the engine control means 31, the first motor control means 32 and the second motor control means 33 in order to change the operation point of the engine 2. In this manner, the electric power consumption changing control is executed. That is, in the electric power consumption changing control, the operation point of the engine 2 is suitably changed (for example, changed from a point A to a point B or C, or to a point D or E as shown in FIG. 6) so as to control the motor-driving electric power to be supplied to the first motor 3 or the regenerated electric power (amount of charge) at the time of regenerative operation of the first motor 3. In this manner, the electric power balance of the HV battery 13 is changed to a discharge side or a charge side.

The shifting-time drive control means 45 centrally controls the engine control means 31, the first motor control means 32, and the second motor control means 33 to decrease the second motor torque $T_{MG2}$ (FIG. 4) output from the second motor 4 so that it is possible to minimize fluctuation of the total output torque $T_{OUT1}+T_{OUT2}$ (see FIG. 4) occurring on the driving wheels 16-side at the time of shifting of the stepped transmission 6. During the shifting of the stepped transmission 6, the shifting-time drive control means 45, using the engine control means 31, the first motor control means 32 and the second motor control means 33, controls the output (driving force) of the second drive unit 10b so that the driving forces of the first and second drive units 10a, 10b are suitably adjusted, for example, so that the sum of the output torques thereof (total output torque $T_{OUT1}+T_{OUT2}$) becomes substantially equal to the driver request torque. In this manner, an output torque equal to or close to the driver request torque can be swiftly achieved while the respective torques of the first and second drive units 10a, 10b are output in an appropriately balanced fashion.

At the time point when the result of the preliminary shift determination is transmitted from the shift control means 37 to the shifting-time drive control means 45, the shifting-time drive control means 45 calculates an increase or decrease in the amount of charge of the battery on the basis of the state of the battery (SOC), and the amount of electric power needed for the torque increase or decrease of the second motor 4 during the shifting, and then determines the aforementioned engine operation point on the basis of the increase or decrease in the battery charge.

Further, the shifting-time drive control means 45 outputs commands to the engine control means 31, the first motor control means 32 and the second motor control means 33 in order to operate the engine 2, the first motor 3 and the second motor 4 in accordance with the engine operation point determined as described above. Specifically, the shifting-time drive control means 45 outputs a control command to the engine control means 31 to control the engine 2 so as to output a target engine torque (e.g., $T_{E2}$ or $T_{E3}$ in FIG. 6). Simultaneously, the shifting-time drive control means 45 outputs a rotation speed control command to the first motor control means 32 to control the first motor 3 so that the engine rotation speed becomes equal to a target engine rotation speed (e.g., $N_{E4}$ or $N_{E1}$ in FIG. 6). Further, the shifting-time drive control means 45 outputs a torque control command to the second motor control means 33 to control the torque of the second motor 4 based on the driver request torque and the output torque of the ring gear R1. Note that, the output torque of the ring gear R1 is output if the first motor torque is used as a reaction force to the engine torque when the first motor 3 is driven according to the rotation speed control.

That is, the shifting-time drive control means 45 executes a control of changing the engine operation point with reference to the engine efficiency map Ma shown in FIG. 6 or through calculation on the basis of, for example, the amount of electric power that the HV battery 13 can store when electric power is generated by the regenerative operation of the first motor 3, and the amount of electric power that can be output from the HV battery 13 to the first motor 3 and the second motor 4, which are detected via the battery state detection means 35, at the time point when the result of preliminary shift determination is transmitted from the shift control means 37 to the shifting-time drive control means 45.

The engine efficiency map Ma is described as follows. For example, if the present engine operation point prior to the engine operation point changing control is, for example, the point A in FIG. 6, the shifting-time drive control means 45 selects an engine operation point that is as close to a best fuel economy (optimal fuel economy) line L as possible, from a plurality of engine operation points (e.g., points B to E) each of which is defined by a combination of the engine torque $T_E$ [Nm] and the engine rotation speed $N_E$ [rpm]. Further, the shifting-time drive control means 45 outputs commands to the engine control means 31, the first motor control means 32 and the second motor control means 33 in order to operate the engine 2, the first motor 3 and the second motor 4 in accordance with the selected operation point. In this operation, the shifting-time drive control means 45 includes, in the aforementioned commands from the shifting-time drive control means 45, a command for the engine control means 31 to increase the rotation speed of the engine 2 as gently as possible so that the power distribution planetary gear 5 absorbs inertia torques caused by rotation changes of the engine 2 or the like, and does not output torque fluctuations to the output shaft 26.

In the above-described example, while the target engine torque is set at $T_{E2}$ or $T_{E3}$ in FIG. 6 and the target engine rotation speed is set at $N_{E4}$ or $N_{E1}$, the engine operation point is changed to the point B or C. The invention is not limited to this example. For example, the engine operation point can be changed to the point D or E in FIG. 6 by an operation described below.

That is, if the present engine operation point is, for example, the point A, the engine rotation speed $N_{E2}$ is kept unchanged, the engine torque $T_{E2}$ that provides the obtained amount of charge, is determined through calculation or with reference to the engine efficiency map Ma. If the engine efficiency map Ma is referred to, the point D is acquired by determining the points of intersection of the present engine rotation speed $N_E$ and the constant-engine power lines.

Furthermore, if the present engine operation point is, for example, the point A, the engine torque $T_{E1}$ is kept unchanged, and the engine rotation speed $N_E$ that provides the obtained amount of charge is determined through calculation or with reference to the engine efficiency map Ma. If the engine efficiency map Ma is referred to, the point E with the engine rotation speed $N_{E5}$ is acquired by determining the points of intersection of the present engine torque $T_{E1}$ and the constant-engine power lines $Ch_1$, $Ch_2$.

Then, after the elapse of a predetermined time following execution of the control, the shifting-time drive control means 45 operates to return the changed engine operation point to the pre-change operation point (e.g., the point A), thus executing an electric power consumption returning control. That is, the shifting-time drive control means 45 executes such a control as to return the outputs of the first motor 3, the second motor 4 and the engine 2 to the pre-shifting outputs thereof, with reference to the engine efficiency map Ma indicated in FIG. 6, on the basis of the state of the HV battery 13 (i.e., the amount of charge that can be stored, the amount of electric power that can be output, etc.) detected by the battery state detection means 35.

Specifically, the shifting-time drive control means 45, using the engine control means 31, controls the amount of fuel injection or the degree of throttle opening regarding the engine 2 so as to reduce the engine torque $T_E$ and/or the engine rotation speed $N_E$ to the value thereof occurring prior to the electric power consumption changing control. Furthermore, using the second motor control means 33, the shifting-time drive control means 45 controls the driving of the second motor 4 so as to change the second motor torque $T_{MG2}$ to the pre-shifting torque (torque at the time point t0 in FIG. 4) while maintaining the reduced rotation speed $N_{MG2}$ of the second motor 4. The engine operation point is thus returned to the pre-shifting operation point. Incidentally, the control of the first motor 3 and the second motor 4 is performed as in the related art. That is, as for the first motor 3, the rotation speed thereof is controlled so that the return of the engine torque $T_E$ and/or the engine rotation speed $N_E$ to the pre-shifting values is achieved. As for the second motor 4, the torque thereof is controlled so that the driver request torque is reached.

Incidentally, the engine control means 31, the first motor control means 32, the second motor control means 33 and the shifting-time drive control means 45 form battery balance control means for, if the shift control means 37 determines that shifting is needed, calculating the amount of increase/decrease in the charge of the HV battery 13 in accordance with the state of the HV battery 13, e.g., SOC (state of charge), and changing the operation point of the engine 2, e.g., changing from the point A to the point B or C or to the point D or E shown in FIG. 6, based on the amount of increase/decrease in the charge, prior to the shifting of the stepped transmission 6.

The torque distribution setting means 46 sets selection and distribution of torque control during shifting, and before and after shifting. The torque distribution setting means 46 calculates the torque that can be output, hereinafter referred to as the "available torque", at the time of torque control during shifting on the basis of the calculated necessary amount of the total output torque $T_{OUT1}+T_{OUT2}$ and the electric power that can be output from the HV battery 13. After calculating the available torque attainable by the torque control, the torque distribution setting means 46 detects the driver request torque using the driver request torque detection means 43, and sets the selection and distribution based on the driver request torque and the calculated available torque.

The torque phase detection means 47 detects engagement states of the first brake B1 and the second brake B2 on the basis of a command output from the shift control means 37 to the linear solenoid valves of the hydraulic pressure control unit 7, or the hydraulic pressures of the hydraulic pressure servos of the first and second brakes B1, B2 detected by the hydraulic pressure detection means 38, or the oil temperature detected by the oil temperature detection means 39. Then, the torque phase detection means 47 detects a torque phase during a shifting that involves the engagement switch-over between the first brake B1 and the second brake B2. The torque phase refers to a state in which only the torque bearing is changed between the first and second brakes B1, B2 during a shifting carried out by engagement switch-over between the first and second brakes B1, B2.

The inertial phase detection means 48 detects the change in the rotation speed of the second motor 4 based on the rotation speed $N_{MG2}$ (see FIG. 4) of the second motor 4 detected by the motor rotation detection means 36, and the vehicle speed (namely, the rotation speed of the output shaft 26 or the transfer shaft 21) detected by the vehicle speed detection means 40. On the basis of the detected change in the rotation speed of the second motor 4, the inertial phase detection means 48 detects an inertial phase during a shifting carried out by the engagement switch-over between the first brake B1 and the second brake B2.

Note that the inertial phase is a state, during shifting in which switch-over between the first brake B1 and the second brake B2 takes place, where the inertia (inertial force) of the second motor 4 changes due to a change of the rotation speed of the second motor 4 with respect to the output shaft 26 of the drive unit 10 resulting from a change in the gear ratio of the stepped transmission 6. In other words, the inertial phase is a state in which there is a change in the transmission ratio between the rotation speed of the rotor shaft 23 (see FIG. 2(a)), that acts as the input shaft of the stepped transmission 6, and the rotation speed of the hub member 22 (see FIG. 2(a)), that acts as the output shaft of the stepped transmission 6.

Figure 3:
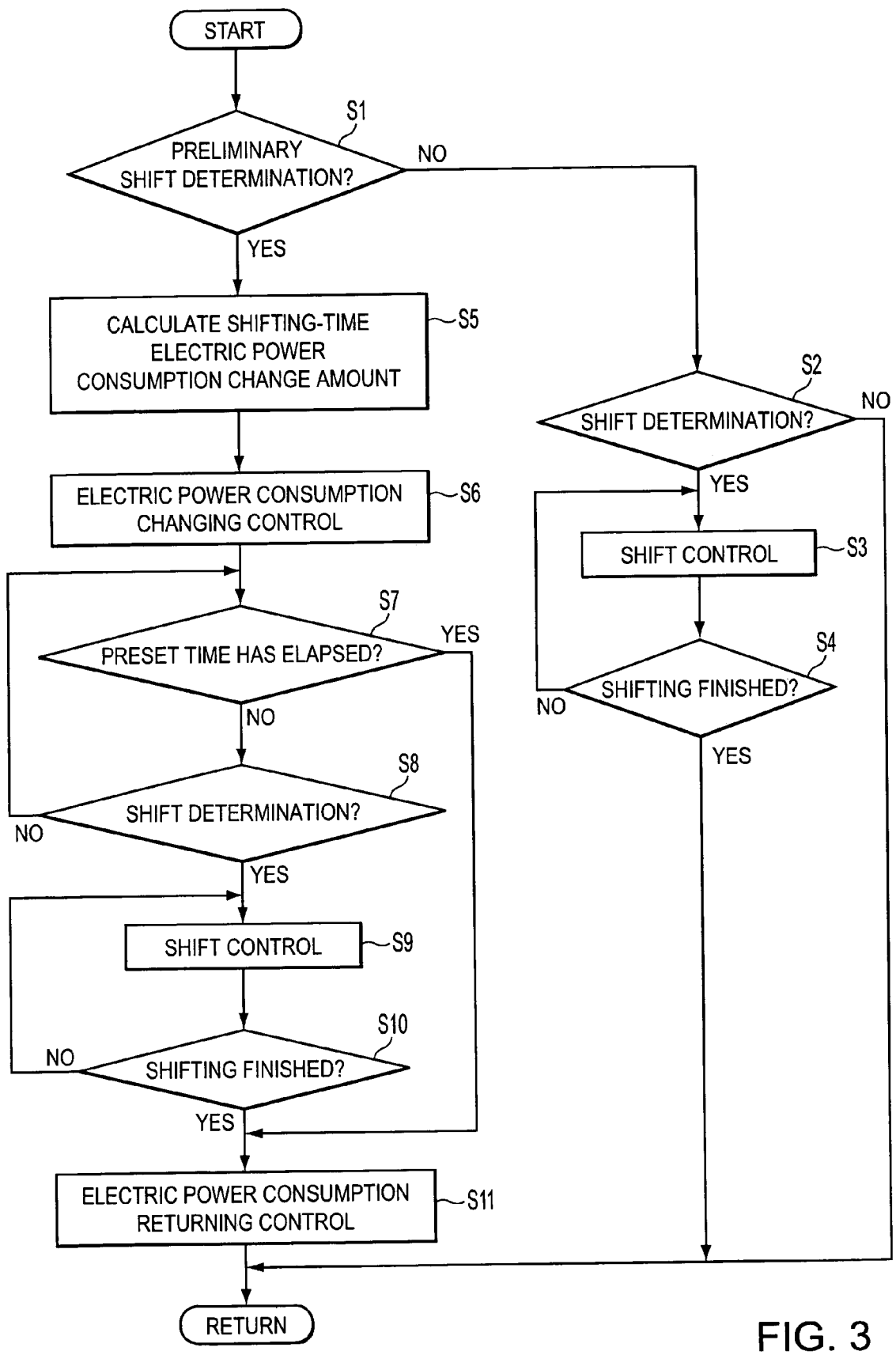
FIG. 3 is a flowchart illustrating an electric power consumption changing control according to an exemplary embodiment of the invention.

Next, an example of a shift control performed by the shift control means 37 and the like during running of the hybrid vehicle having the control apparatus 1 of the exemplary embodiment will be described with reference to the flowchart of FIG. 3, the time chart of FIG. 4, the shift map of FIG. 5, and the engine efficiency map of FIG. 6.

Figure 4:
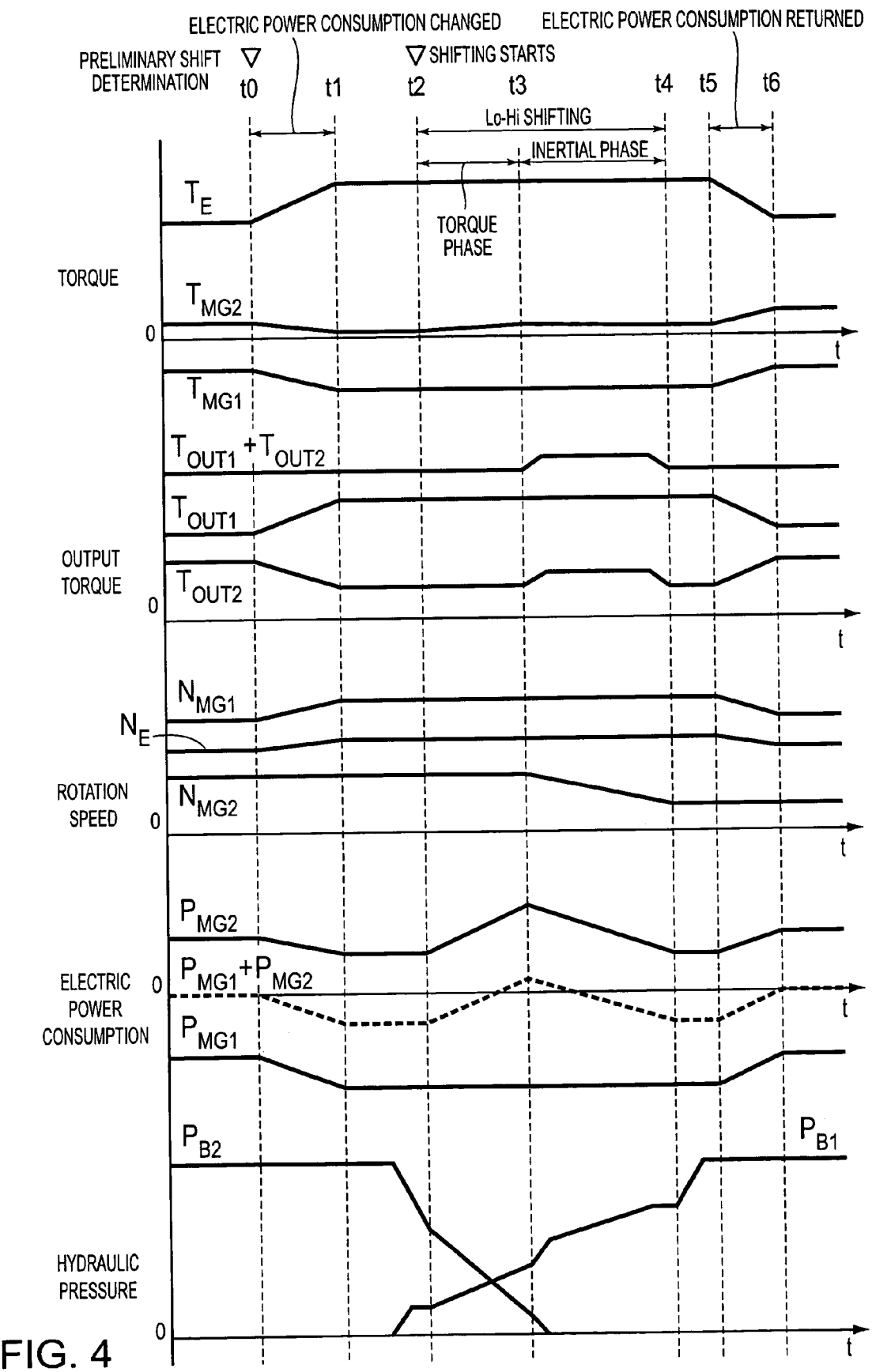
FIG. 4 is a time chart indicating changes in the timing of various elements and the like when the electric power consumption changing control is executed at the time of upshifting.

The time chart of FIG. 4 indicates the timings of changes in various parameters related to various components of the hybrid vehicle that take place when the engine operation point is changed from A to B, and is then returned back to A. Specifically, FIG. 4 indicates, from the top: changes in the torques $T_E$, $T_{MG2}$, and $T_{MG1}$ of the engine 2, the second motor 4 and the first motor 3 respectively; changes in the total output torque $T_{OUT1}+T_{OUT2}$, the first drive torque $T_{OUT1}$ from the first drive unit 10a, and the second drive torque $T_{OUT2}$ from the second drive unit 10b; changes in the rotation speed $N_{MG1}$ of the first motor 3, the rotation speed $N_E$ of the engine 2, and the rotation speed $N_{MG2}$ of the second motor 4; changes in the power consumption $P_{MG2}$ of the second motor 4, the total power consumption $P_{MG1}+P_{MG2}$, and the power consumption $P_{MG1}$ of the first motor 3; and changes in the hydraulic pressure $P_{B1}$ supplied to the first brake B1, and the hydraulic pressure $P_{B2}$ supplied to the second brake B2. Note that, in FIG. 4, it is assumed that the accelerator operation degree is constant, the driver request torque is constant, and the vehicle speed is substantially constant.

Figure 5:
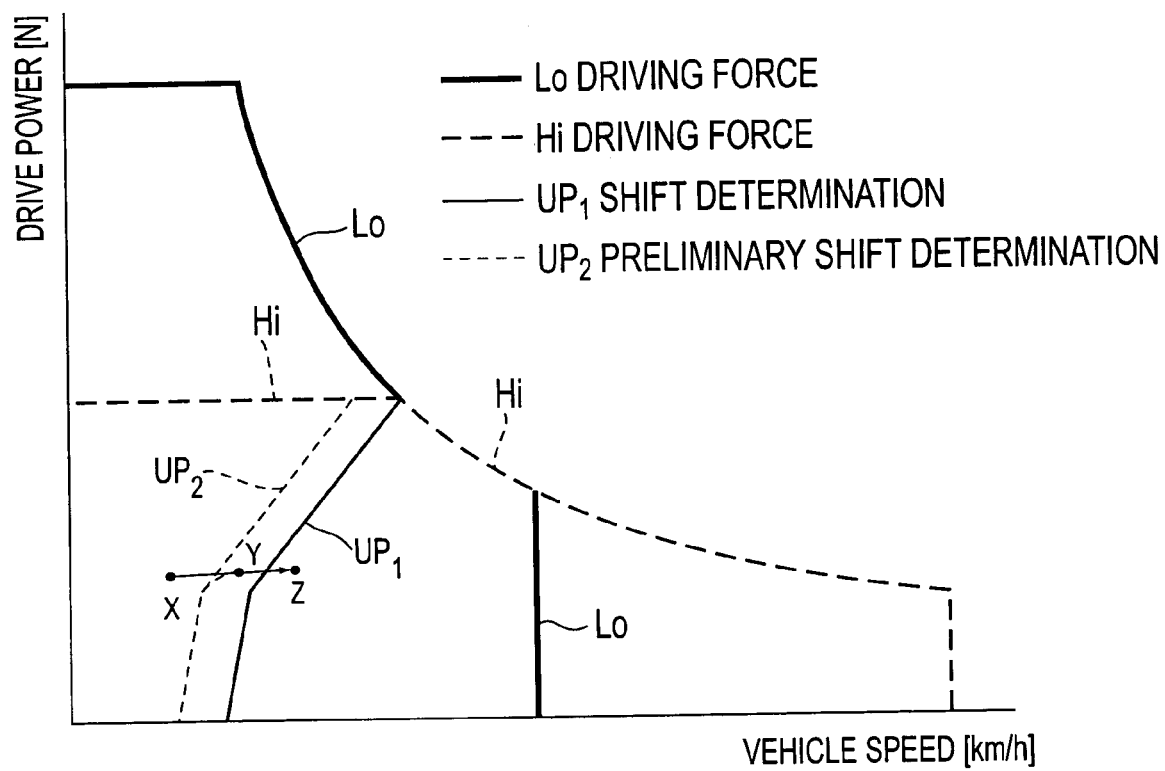
FIG. 5 is a graph indicating the content of a shift map for making a shift determination and a preliminary shift determination via shift control means.

In the shift map of FIG. 5, the horizontal axis indicates the vehicle speed [km/h], and the vertical axis indicates the driving force [N], which is the driver request torque. The bold solid line Lo indicates the change in the driving force at low speed, and the bold broken line Hi indicates the change in the driving force at high speed. The thin solid line $UP_1$ indicates a shift determination, and the thin broken line $UP_2$ indicates a preliminary shift determination. The preliminary shift determination in the preliminary shift determination mode is performed when the magnitudes of the respective changes of the driver request torque and the vehicle speed (which are predetermined conditions for the determination) are relatively small in comparison with the magnitudes of the respective changes of the predetermined conditions in the case of the shift determination in the shift determination mode.

In the engine efficiency map Ma shown in FIG. 6, the horizontal axis indicates the engine rotation speed $N_E$ [rpm], and the vertical axis indicates the engine torque $T_E$ [Nm]. In FIG. 6, the point A indicates an engine operation point before changing the operation point, and the point B indicates a post-change engine operation point that is reached if there is no restriction on the amount of charge into the HV battery 13.

The point B, located on a best fuel economy line L, is an engine operation point to which the operation point can change from the point A if the engine rotation speed $N_E$ and the engine torque $T_E$ are increased to $N_{E4}$ and $T_{E2}$, respectively, and the amount of charge into the HV battery 13 is increased.

The point C is a post-change engine operation point that is reached if there is a restriction on the amount of charge into the HV battery 13. The point C, located on the best fuel economy line L, is an engine operation point to which the operation point can change from the point A if the engine rotation speed $N_E$ and the engine torque $T_E$ are reduced to $N_{E1}$, $T_{E3}$ below the engine operation point A and the amount of charge into the HV battery 13 is reduced. The point D is an engine operation point that is an intermediate point between the engine operation point B and the engine operation point C. The point E is an engine operation point that is reached if, while the engine torque $T_{E1}$ of the operation point A is maintained, the engine rotation speed $N_E$ is increased to $N_{E5}$ and the amount of charge is increased by increasing the rotation speed $N_{MG1}$ of the first motor 3.

In FIG. 6, the curve of a broken line MT indicates the maximum torque, and the curve of the solid line L is the best fuel economy line. Further, the closed loops indicated by $F_1$ to $F_3$ are constant-fuel consumption rate lines. The lines $F_1$ to $F_3$ are established by connecting points having the same rate of fuel consumption (for example, the number of grams of fuel consumed per one horse power for one hour (g/ps·h)) in a fashion of contour lines. If the suffix number of a closed loop $F_1$, $F_2$, $F_3$ is smaller, it is indicated that the fuel consumption rate is lower, i.e., the fuel economy is better. The curves (constant-engine power lines) indicated by $Ch_1$, $Ch_2$ indicate increases and decreases in the amount of charge of the HV battery 13. The amount of charge increases progressively with transition from $Ch_1$ to $Ch_2$.

The best fuel economy line L is determined by engine characteristics. In this embodiment, due to the presence of the stepped transmission 6, the engine rotation speed $N_E$ at a given time point is substantially determined in accordance with the vehicle speed and the gear ratio of the selected shift speed (the high speed stage or the low speed stage). Specifically, the best fuel economy line L is set beforehand as a line where a relationship between the engine rotation speed $N_E$ and the engine torque $T_E$ is determined such that (a) the output engine torque $T_E$ smoothly changes in accordance with change in the engine rotation speed $N_E$ (i.e., the change in the vehicle speed), and (b) a best fuel economy state is achieved. Accordingly, the engine 2 is capable of outputting the engine torque $T_E$ in the most efficient state at a given point of time. The engine torque $T_E$ can be changed freely by controlling the degree of throttle opening of the engine 2 through the electronic throttle control.

In FIG. 4, at least until the time point t0, the hydraulic pressure $P_{B2}$ is applied to the hydraulic pressure servo such that the second brake B2 is engaged. Accordingly, the low speed stage (Lo) is set in the stepped transmission 6. In the low speed stage state, the second motor 4 is rotated at the rotation speed $N_{MG2}$ corresponding to the gear ratio of the stepped transmission 6 and the vehicle speed, and the second motor torque $T_{MG2}$ is output in response to the driver request torque detected by the driver request torque detection means 43. The engine 2 and the first motor 3 rotate at rotation speeds $N_E$ and $N_{MG1}$ which are higher than the rotation speed $N_{MG2}$ of the second motor 4. The engine torque $T_E$ corresponding to the reaction force resulting from the output of the first motor 3 is output from the power distribution planetary gear 5.

While the vehicle is running in the above state, for example, at the time point t0, the shift control means 37 makes a preliminary shift determination (step S1 of FIG. 3) in the preliminary shift determination mode (based on the shift map shown in FIG. 5). Specifically, the shift control means 37 refers to the shift map shown in FIG. 5, and makes a preliminary shift determination that upshifting is to be performed when the vehicle speed [km/h] and the driving force (driver request torque) [N] change from X to Y in FIG. 5, based on the degree of accelerator operation (the driver request torque), the running state of the vehicle, and the like.

When it is determined that transition to shifting is not to be performed as a result of the preliminary shift determination in step S1, the shift determination is made in step S2, in the same manner as in step S8 described later. If it is determined in step S2 that transition to shifting is not to be performed, the process is finished (returns). If it is determined that transition to shifting is to be performed, the process proceeds to step S3, in which a shift control is performed in the same manner as in step S9 described later. Subsequently in step S4, it is determined whether shifting is to be completed. If it is determined that the shifting is to be completed as a result of the shift end determination of step S4, the process is finished (returns). If it is determined that shifting is not completed, the shift control of step S3 is repeated.

On the other hand, if it is determined by the preliminary shift determination in step S1 that transition to shifting is to be performed, the process proceeds to step S5, in which the shift control means 37 refers to the engine efficiency map Ma shown in FIG. 6. Let it be assumed herein that the engine operation point at the time of making the preliminary shift determination is, for example, the engine operation point A. The shift control means 37 selects, for example, the engine operation point B, as a new point to which the engine operation point is to be changed from the point A, and then transmits the result of the selection to the shifting-time drive control means 45. In response to the received result of the selection, the shifting-time drive control means 45 calculates the amount of increase/decrease in the charge of the HV battery 13 in accordance with the state of the HV battery 13 (e.g., the SOC thereof). On the basis the calculated amount, the shifting-time drive control-means 45 calculates a shifting-time electric power consumption change amount, prior to the shifting of the stepped transmission 6.

Subsequently, in step S6, in order to execute an electric power consumption changing control, the shifting-time drive control means 45 outputs commands, on the basis of the calculated amount of increase/decrease in the battery charge, to the engine control means 31, the first motor control means 32 and the second motor control means 33 to operate the engine 2, the first motor 3 and the second motor 4 so as to change the engine operation point from A to B. Specifically, from the time point to toward the time point t1, shown in FIG. 4, the shifting-time drive control means 45, using the engine control means 31, controls the degree of throttle opening of the engine 2 through the electronic throttle control so as to increase the engine torque $T_E$ by a predetermined amount. At the same time, the shifting-time drive control means 45, using the first motor control means 32, slightly increases the first motor torque $T_{MG1}$ in a predetermined direction (in the reverse or negative direction) to increase the reaction force. The shifting-time drive control means 45 thus operates so as to change the operation point of the engine 2 from A to B.

Simultaneously, the shifting-time drive control means 45 controls the second motor control means 33 to maintain the rotation speed $N_{MG2}$ of the second motor 4 and decrease the second motor torque $T_{MG2}$ by a predetermined amount. Thus, the engine operation point is changed from A to B. In this operation, the engine torque $T_E$ increases during a period of the time point t0 to t1 in FIG. 4 (i.e., from $T_{E1}$ to $T_{E2}$ in FIG. 6). The electric power regenerated by the first motor 3 flows in such a direction as to be charged into the HV battery 13, i.e., the amount of charge increases from $Ch_1$ to $Ch_2$ in FIG. 6, so that the electric power balance of the HV battery 13 changes toward the charge side.

Then in step S7, the shift control means 37 determines whether a predetermined time has elapsed from the time point t1. If it is determined in step S7 that a predetermined time has elapsed, the process jumps to step S10, in which an engine operation point restoration control, described later, is executed. Conversely, if it is determined in step S7 that the predetermined time has not elapsed, the process proceeds to S8. In step S8, the shift control means 37 executes, on the basis of the shift map shown in FIG. 5 or the like, a shift determination process of determining whether shifting (upshifting in this case) is to be performed at the time point when the driver request torque changes from the line $UP_2$ to the line $UP_1$, for example, a change from Y to Z in FIG. 5.

If it is determined in step S8 that transition to shifting is to be performed, the shift control is started at the time point t2 in step S9. This shift control will be described below, starting with the change in the hydraulic pressure. Specifically, before the time point t2 is reached, the shift control means 37 controls the linear solenoid valve (not shown) of the hydraulic pressure control unit 7 to start increasing the hydraulic pressure $P_{B1}$ of the hydraulic servo of the first brake B1, so that the piston of the hydraulic servo of the first brake B1 and the friction plate (not shown) of the first brake B1 become closer to each other. Thus, so-called "play reduction" is carried out. Shortly before the time point t2, the shift control means 37 controls the hydraulic pressure control unit 7 to start decreasing the hydraulic pressure $P_{B2}$ of the hydraulic servo of the second brake B2 and therefore starts reducing the pressing force exerted onto the friction plate of the second brake B2 by the piston of the hydraulic servo.

At the time point t2, the shift control means 37 slowly decreases the hydraulic pressure $P_{B2}$ of the hydraulic servo of the second brake B2, and slowly increases the hydraulic pressure $P_{B1}$ of the hydraulic servo of the first brake B1. Thus, the friction plate of the second brake B2 is brought into a slipping state, whereby the transmission torque of the second brake B2 is decreased. Further, the friction plate of the first brake B1 is brought into a slipping state, whereby the transmission torque of the first brake B1 is increased. Thus, the transmission torque of the first brake B1 gradually replaces the transmission torque of the second brake B2, that is, the torque phase is entered. In the torque phase, both the first brake B1 and the second brake B2 slip, and the transmission torque of the stepped transmission 6 as a whole decreases. Therefore, the second drive torque $T_{OUT2}$ from the second drive unit 10b, which has decreased due to the decrease in the second motor torque $T_{MG2}$ starting at the time point t0, continues to be in the decrease state. During the shifting of the stepped transmission 6 from the time point t2 to the time point t3, the shifting-time drive control means 45 executes such a control as to increase the second motor torque $T_{MG2}$ so that the driving forces before and after the shifting (i.e., the total output torque $T_{OUT1}+T_{OUT2}$) are equal to the driver request torque.

Then, the torque of the first brake B1 replaces the torque of the second brake B2. At the time point t3, when the transmission torque of the second brake B2 has decreased to substantially zero, torque transmission is now realized only by the first brake B1. The shift control means 37 then further increases the hydraulic pressure $P_{B1}$ of the hydraulic servo of the first brake B1. Thus, the first brake B1 gradually changes from the slipping state to an engaged state, and the gear ratio of the stepped transmission 6 changes from the low speed stage (Lo) to the high speed stage (Hi). Accordingly, the rotation speed $N_{MG2}$ of the second motor 4 is decreased, that is, the inertial phase is entered. Then, the inertial phase detection means 48 detects the inertial phase based on the change in the rotation speed $N_{MG2}$ of the second motor 4 and the vehicle speed. After the time point t3, the hydraulic pressure $P_{B2}$ of the hydraulic servo of the second brake B2 is drained (discharged) so that the hydraulic pressure $P_{B2}$ becomes substantially zero.

From the time point t3 to the time point t4, the above control is repeatedly carried out, so that the rotation speed $N_{MG2}$ of the second motor 4 decreases. At the time point t4, the first brake B1 is substantially fully engaged. In the inertial phase, the rotation speed $N_{MG2}$ of the second motor 4 with respect to the transfer shaft 21 (i.e., with respect to the driving wheels 16) changes. Therefore, an inertial force occurs in the stepped transmission 6 corresponding to the amount of change in the rotation speed $N_{MG2}$. The torque corresponding to the inertia force (hereinafter referred to as the "inertia torque") is output from the second drive unit 10b. Therefore, the second drive torque $T_{OUT2}$ of the second drive unit 10b temporarily increases due to the inertia torque between the time points t3 and t4 in FIG. 4, and then decreases gradually as the rotation speed $N_{MG2}$ converges on the high speed stage side.

Subsequently, from the time point t4 to t5, the shift control means 37 increases the hydraulic pressure $P_{B1}$ of the hydraulic servo of the first brake B1 up to a hydraulic pressure for full engagement. Then, in step S10 of FIG. 3, the shift control means 37 determines whether shifting has been completed. If it is determined that shifting has not been completed, the shift control in step S9 is repeatedly carried out. The shift control means 37 finishes the shift control at the time point t5 when it is determined in step S10 that shifting has been completed.

Subsequently in step S11, the shift control means 37 executes the electric power consumption returning control.

Specifically, in the electric power consumption returning control, during the period from time point t5 to t6, the shifting-time drive control means 45 controls the second motor control means 33 to maintain the reduced rotation speed $N_{MG2}$ of the second motor 4, and controls the engine control means 31 and the first motor control means 32 to maintain the rotation speeds $N_E$, $N_{MG1}$ of the engine 2 and the first motor 3, and controls the engine control means 31 to decrease the engine torque $T_E$ to the torque occurring prior to the engine torque control, thereby returning the engine operation point from B to A. Simultaneously, using the second motor control means 33, the shifting-time drive control means 45 controls the driving of the second motor 4 so as to bring the second motor torque $T_{MG2}$ close to the torque occurring at the time point t0 prior to the shifting.

In the above-described control, over the entire period from time point t0 to t6, the electric power consumption $P_{MG2}$ of the second motor 4 is decreased and the electric power consumption $P_{MG1}$ of the first motor 3 is also decreased. Therefore, the total energy consumption $P_{MG1}+P_{MG2}$ is generally on the charge side in terms of the electric power balance although the total energy consumption $P_{MG1}+P_{MG2}$ changes slightly to zero and to the discharge side during the period from time point t2 to time point t3. Although in the case indicated by the time chart of FIG. 4 in conjunction with the embodiment, the electric power balance is changed to the charge side due to the control related to the SOC of the HV battery 13 or the like, this is merely illustrative. For example, if the SOC of the HV battery 13 is high, a control may be executed such that the electric power balance is changed to the discharge side, so that the HV battery 13 is not charged but is discharged. The first motor 3 and the second motor 4 are thus driven and controlled.

In conjunction with the exemplary embodiment, only upshifting, from the low speed stage to the high speed stage, has been described. Downshifting, from the high speed stage to the low speed stage, is different in that the torque phase and the inertial phase conversely occur, and the change of the state occurs substantially in the manner opposite to upshifting.

As described above, in the control apparatus 1 of the hybrid vehicle according to the exemplary embodiment, if the shift control means 37 determines that there is a need for shifting, the battery balance control means, including the engine control means 31, the first motor control means 32, and the second motor control means 33 and the during shift drive control means 45, calculates the amount of increase/decrease in the charge of the HV battery 13 in accordance with the state of the HV battery 13, e.g., the SOC thereof. On the basis of the amount of increase/decrease in the battery charge, the pattern balance control means changes the operation point of the engine 2, prior to the shifting of the stepped transmission 6. Therefore, on the side of the second drive unit 10b, the supply of electric power to the second motor 4 is always appropriately performed, regardless of the state of charge of the HV battery 13, so that sufficient driving force of the second motor 4 is attained to substantially avoid torque fluctuation of the stepped transmission 6 at the time of shifting. On the side of the first drive unit 10a, the first motor 3 can be appropriately operated within an allowable range of the amount of the battery charge in connection with the supplied power or the regenerated power, due to the engine 2 driven on the basis of the engine operation point changed on the basis of the amount of increase/decrease in the battery charge. Therefore, the output fluctuation on the driving wheels 16-side during shifting can be minimized.

In changing the engine operation point, the control means 31, 32, 33, 45 may execute such a control as to change the engine torque $T_E$ without changing the engine rotation speed $N_E$. In that case, the engine torque $T_E$ that achieves the calculated amount of charge without involving a change in the engine rotation speed $N_E$ is determined through calculation alone or using an engine efficiency map Ma (FIG. 6). As a result, the changing of the engine operation point from, for example, point A to point D (FIG. 6), can be appropriately performed. Therefore the first motor 3 can be appropriately operated within an allowable range of the amount of charge in connection with the supplied power or the regenerated power.

Furthermore, in changing the engine operation point, the control means 31, 32, 33, 45 may also execute such a control as to change the engine rotation speed $N_E$ without changing the engine torque $T_E$. In that case, the engine rotation speed $N_E$ that achieves the calculated amount of charge without involving a change in the engine torque $T_E$ is determined through calculation alone or using an engine efficiency map Ma (FIG. 6). As a result, the changing of the engine operation point from, for example, point A to point E (FIG. 6), can be appropriately performed. Therefore, the first motor 3 can be appropriately operated within an allowable range of the amount of charge in connection with the supplied power or the regenerated power.

Then, using the engine efficiency map Ma in which engine operation points are pre-set so as to achieve a best fuel economy for each of various rotation speeds of the engine 2, the control means 31, 32, 33, 45 executes a control to change the engine operation point to a point on the best fuel economy line L. Then, if, using the engine efficiency map Ma (FIG. 6), the points of intersection of the best fuel economy line L (FIG. 6) and the constant-engine power lines $Ch_1$, $Ch_2$ (FIG. 6) for achieving the calculated amount of increase/decrease in the battery charge are determined, the engine operation point can be appropriately changed from point A to point B as shown in FIG. 6. Therefore, by executing a control on the best fuel economy line L in the engine efficiency map Ma or in the vicinity of the best fuel economy line L, the first motor 3 can be appropriately operated within an allowable range of the amount of charge in connection with the supplied power or the regenerated power.

Furthermore, after shifting of the stepped transmission 6 is completed, the control means 31, 32, 33, 45 executes a returning control to return the torques $T_E$, $T_{MG1}$, $T_{MG2}$ of the engine 2, the first motor 3 and the second motor 4 to the torque values corresponding to the pre-shifting engine operation point, e.g., point A, in the engine efficiency map Ma, on the basis of the battery states, including the SOC (amount of remaining charge) of the HV battery 13, and the like. Therefore, even though the balance among the engine torque $T_E$ and the first and second motor torques $T_{MG1}$, $T_{MG2}$ changes during the shifting, these torques are quickly returned to the values occurring prior to the shifting. For example, the engine torque $T_E$ increased during the shifting is promptly reduced to curb fuel consumption, so that the fuel economy will improve.

In the electric power consumption changing control based on the changing of the engine operation point, if the SOC of the HV battery 13 is within a predetermined range, e.g., the range of $Ch_1$ to $Ch_2$ in FIG. 6, the engine torque $T_E$ is increased so as to increase the output torque of the power distribution planetary gear 5, and therefore increase the amount of electric power generation, i.e., the amount of charging. In this case, it is preferable that the engine be operated at operation points that optimize fuel economy. If the SOC of the HV battery 13 is outside the predetermined range, outside the range of $Ch_1$ to $Ch_2$ in FIG. 6, the output torque of the power distribution planetary gear 5 may be increased in some cases by, for example, increasing the engine torque $T_E$ while decreasing the engine rotation speed $N_E$. In such a case, it becomes difficult to operate the engine at engine operation points that optimize fuel economy, but a situation where the electric power generation is not increased is attained.

Although in the foregoing exemplary embodiment, the shift control means 37 executes the shift determination process after the preliminary shift determination process, it is also possible to execute only the shift determination process without executing the preliminary shift determination process. In such a case, although the preliminary shift determination process described above in conjunction with the exemplary embodiment is not executed, substantially the same advantages as those of the exemplary embodiment can be achieved by executing only a shift determination process in which the levels of changes in the degree of accelerator operation and the vehicle speed for determining that shifting is to be performed, i.e., conditions for determination, are slightly higher than the levels of changes in the conditions for determination.

In the foregoing embodiment, the stepped transmission 6 is equipped with the first brake B1 and the second brake B2, and performs the shifting of two speeds, that is, the high speed stage and the low speed stage. However, this is merely illustrative. It should be apparent that the invention is also applicable to structures in which the stepped transmission is a multi-speed transmission that performs, for example, three-speed shifting, four-speed shifting, etc.

In the foregoing embodiment, in the process of increasing/decreasing the outputs of the first and second drive units 10a, 10b prior to the shifting of the stepped transmission 6, the engine operation point is changed and the first motor torque $T_{MG1}$ of the first motor 3 is increased or decreased corresponding to the changing of the operation point, whereby the electric power balance of the HV battery 13 is changed to the discharge side or the charge side. However, it should be apparent that the changing of the electric power balance can be accomplished not only by the aforementioned increase/decrease in torque but also by increase/decrease in rotation speed, and the like.

Furthermore, in the foregoing embodiment, the control means 31, 32, 33, 45 calculates the amount of electric power consumption needed for shifting, and always changes the engine operation point based on the calculated amount of electric power consumption. However, this structure is merely illustrative. For example, it is also possible to adopt a structure as follows. That is, the control means 31, 32, 33, 45 determines whether the amount of electric power to be consumed can be output from the HV battery 13. If it is determined that the amount of electric power to be consumed can be output from the HV battery 13, the engine operation point is not changed. Conversely, if it is determined that the amount of electric power to be consumed cannot be output from the HV battery 13, the engine operation point is changed. This structure makes it possible to always execute an appropriate control corresponding to the state of the HV battery 13. In this structure, the engine operation point may be changed substantially in the same fashion as in the foregoing embodiment.

Figure 7:
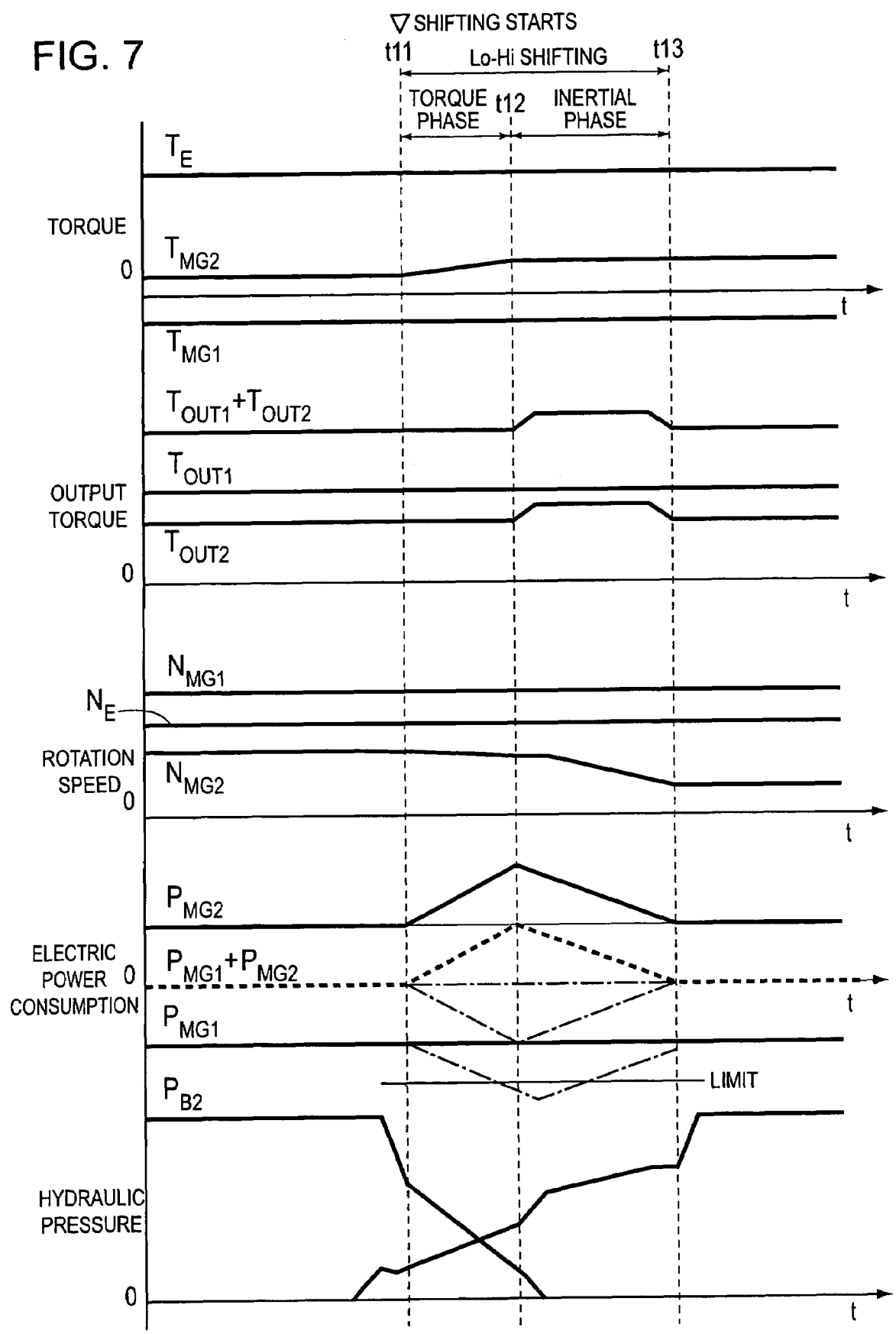
FIG. 7 is a time chart indicating a comparative example for comparison with the exemplary embodiment of the invention.

A comparative example for comparison with the foregoing embodiment will be described with reference to FIG. 7. FIG. 7 is a time chart indicating the contents of control in the comparative example. Initially, the stepped transmission 6 is in the low speed stage state with the second brake B2 engaged. The second motor 4 rotates at a rotation speed $N_{MG2}$ corresponding to the gear ratio of the stepped transmission 6 and the vehicle speed, and outputs the second motor torque $T_{MG2}$ corresponding to the driver request torque. The engine 2 and the first motor 3 rotate at rotation speeds $N_E$, $N_{MG1}$ that are higher than the rotation speed $N_{MG2}$ of the second motor 4, and the power distribution planetary gear 5 outputs an engine torque $T_E$ corresponding to the reaction force based on the output of the first motor 3.

In the comparative example, the shift control starts in the above-described state, but an electric power consumption changing control as in the foregoing embodiment is not performed. Specifically, the shift control is performed so as to carry out the shifting of the stepped transmission 6 by increasing the second motor torque $T_{MG2}$ alone while keeping the engine torque $T_E$ and the first motor torque $T_{MG1}$ unchanged before and after the shifting of the stepped transmission 6. Therefore, in the course from the start of shifting at time point t11 to the end of shifting at time point t13 via the torque phase and the inertia phase starting at the time point t12, the second motor torque $T_{MG2}$ is not reduced, and therefore the second drive torque $T_{OUT2}$ does not drop during the torque phase from time point t11 to time point t12.

Due to the aforementioned increase in the second motor torque $T_{MG2}$, the electric power consumption $P_{MG2}$ of the second motor 4 greatly changes generally in the form of a hill during the period from time point t11 to time point t13 with a peak reached at time point t12. If, for example, the electric power consumption $P_{MG1}$ of the first motor 3 should increase near time point t12 when the electric power consumption $P_{MG2}$ of the second motor 4 peaks, there is a possibility of an incident where the limit value of supply of electric power from the HV battery 13 (indicated by "Limit" in FIG. 7) is exceeded so that an appropriate control cannot be performed.

As is apparent from the foregoing description, the control apparatus of a hybrid vehicle in accordance with the invention is useful for hybrid type vehicles, such as passenger cars, trucks, buses, etc. In particular, the control apparatus of the invention is suitable for use in hybrid vehicles that are designed to prevent torque fluctuations at the time of shifting of a stepped transmission.

What is claimed is:

1. A control apparatus of a hybrid vehicle, comprising:
   a first drive unit that includes a first electric motor and a power distribution device that outputs driving force to a driving wheel via a differential device using an engine and the first electric motor and without using a stepped transmission;
   a second drive unit that includes a second electric motor and a stepped transmission disposed between the second electric motor and the driving wheel;
   a battery capable of both supplying electric power to the first electric motor and the second electric motor and storing electric power regenerated by the first electric motor and the second electric motor;
   shift determination means for determining whether there is a need for shifting carried out by the stepped transmission;
   battery state detection means for detecting a state of the battery;
   shifting-time drive control means for controlling driving force output from the second drive unit so that driving force output from the first drive unit and the second drive unit to the driving wheel substantially reaches a driver request torque; and
   battery balance control means for calculating an amount of increase/decrease in a charge amount of the battery in accordance with the state of the battery detected by the battery state detection means and changing an operation point of the engine based on the amount of increase/decrease in the charge amount, prior to the shifting of the stepped transmission, if the shift determination means determines that there is a need for the shifting of the stepped transmission, wherein:
   the battery balance control means calculates an electric power consumption that is needed for controlling the driving force from the second drive unit during the shifting at a time of determining that there is the need for the shifting, calculates the amount of increase/decrease in the charge amount of the battery in accordance with the state of the battery and the calculated electric power consumption of the second drive unit, and changes the operation point of the engine based on the amount of increase/decrease in the charge amount prior to the shifting if it is determined that it is impossible to output the amount of electric power from the battery.

2. The control apparatus according to claim 1, wherein, in changing the operation point of the engine, the battery balance control means executes such a control as to change an engine torque without changing an engine rotation speed.

3. The control apparatus according to claim 2, wherein the battery balance control means calculates an electric power consumption that is needed for the shifting to be performed, and determines whether it is possible to output the amount of electric power from the battery, and where, if it is determined that it is possible to output the amount of electric power from the battery, the battery balance control means avoids a change of the operation point of the engine, and wherein, if it is determined that that it is impossible to output the amount of electric power from the battery, the battery balance control means executes such a control as to change the operation point of the engine.

4. The control apparatus according to claim 1, wherein, in changing the operation point of the engine, the battery balance control means executes such a control as to change an engine rotation speed without changing an engine torque.

5. The control apparatus according to claim 4, wherein the battery balance control means calculates an electric power consumption that is needed for the shifting to be performed, and determines whether it is possible to output the amount of electric power from the battery, and where, if it is determined that it is possible to output the amount of electric power from the battery, the battery balance control means avoids a change of the operation point of the engine, and wherein, if it is determined that that it is impossible to output the amount of electric power from the battery, the battery balance control means executes such a control as to change the operation point of the engine.

6. The control apparatus according to claim 1, further comprising an engine efficiency map in which operation points of the engine are pre-set so as to achieve a best fuel economy for each of various engine rotation speeds, wherein the battery balance control means executes such a control as to change the operation point of the engine onto a best fuel economy line in the engine efficiency map.

7. The control apparatus according to claim 6, wherein the battery balance control means calculates an electric power consumption that is needed for the shifting to be performed, and determines whether it is possible to output the amount of electric power from the battery, and where, if it is determined that it is possible to output the amount of electric power from the battery, the battery balance control means avoids a change of the operation point of the engine, and wherein, if it is determined that that it is impossible to output the amount of electric power from the battery, the battery balance control means executes a control to change the operation point of the engine.

8. The control apparatus according to claim 1, wherein the battery balance control means executes a returning control to resume a torque of the first electric motor and a torque of the engine corresponding to the operation point of the engine set prior to the shifting based on the state of the battery after the shifting of the stepped transmission has ended.

9. The control apparatus according to claim 8, wherein the battery balance control means calculates an electric power consumption that is needed for the shifting to be performed, and determines whether it is possible to output the amount of electric power from the battery, and where, if it is determined that it is possible to output the amount of electric power from the battery, the battery balance control means avoids a change of the operation point of the engine, and wherein, if it is determined that it is impossible to output the amount of electric power from the battery, the battery balance control means executes a control to change the operation point of the engine.

10. The control apparatus according to claim 1, wherein the battery balance control means calculates an electric power consumption that is needed for the shifting to be performed, and determines whether it is possible to output the amount of electric power from the battery, and where, if it is determined that it is possible to output the amount of electric power from the battery, the battery balance control means avoids a change of the operation point of the engine, and wherein, if it is determined that that it is impossible to output the amount of electric power from the battery, the battery balance control means executes a control to change the operation point of the engine.

11. The control apparatus according to claim 1, wherein calculating the amount of increase/decrease in the charge amount of the battery is conducted according to electricity consumption necessary for a torque change of the second electric motor while the battery balance control means is to change a first electric motor electricity amount by changing the engine operation point based on the amount of increase/decrease in the charge amount of the battery.

12. The control apparatus according to claim 1, wherein:
the operation point of the engine is set to achieve a best fuel economy state for the engine against a requested driving force,
an electric power amount of the first motor and the second motor is determined based on the operation point of the engine and the requested driving force,
calculating the amount of increase/decrease in the charge amount of the battery is conducted according to electricity consumption necessary for a torque change of the second electric motor during the shifting, and
the battery balance control means changes the operation point of the engine when it is able to output the electric power amount required during a shifting from the battery, based on a state of the battery and the calculated amount of increase/decrease in the charge amount.

13. A control method for a hybrid vehicle, having a first drive unit that includes a first electric motor and a power distribution device that outputs driving force to a driving wheel via a differential device using an engine and the first electric motor and without using a stepped transmission; a second drive unit that includes a second electric motor and a stepped transmission disposed between the second electric motor and the driving wheel; a battery capable of both supplying electric power to the first electric motor and the second electric motor and storing electric power regenerated by the first electric motor and the second electric motor; and a controller, the method comprising:
determining a driver request torque;
determining whether there is a need for shifting to be carried out by the stepped transmission;
detecting a state of the battery;
controlling driving force output from the second drive unit so that driving force output from the first drive unit and the second drive unit to the driving wheel substantially reaches the driver request torque;
calculating an amount of increase/decrease in a charge amount of the battery in accordance with the state of the battery detected by the battery state detection means;
changing an operation point of the engine based on the amount of increase/decrease in the charge amount, prior to the shifting of the stepped transmission, if the shift determination means determines that there is a need for the shifting of the stepped transmission;
calculating an electric power consumption that is needed for controlling the driving force from the second drive unit during the shifting at a time of determining that there is the need for the shifting;
calculating the amount of increase/decrease in the charge amount of the battery in accordance with the state of the battery and the calculated electric power consumption of the second drive unit; and
changing the operation point of the engine based on the amount of increase/decrease in the charge amount prior to the shifting if it is determined that it is impossible to output the amount of electric power from the battery.

14. The control method according to claim 13, wherein, in changing the operation point of the engine, executing a control so to change an engine rotation speed without changing an engine torque.

15. The control method according to claim 14, further comprising:
calculating an electric power consumption needed for the shifting to be performed; and
determining whether it is possible to output the amount of electric power from the battery, wherein, if it is determined that it is possible to output the amount of electric power from the battery, avoiding a change of the operation point of the engine and, if it is determined that that it is impossible to output the amount of electric power from the battery, executing a control to change the operation point of the engine.

16. The control method according to claim 13, further comprising using an engine efficiency map in which operation points of the engine are pre-set so as to achieve a best fuel economy for each of various engine rotation speeds, wherein control is executed so as to change the operation point of the engine onto a best fuel economy line in the engine efficiency map.

17. The control method according to claim 16, further comprising:
calculating an electric power consumption needed for the shifting to be performed; and
determining whether it is possible to output the amount of electric power from the battery, wherein, if it is determined that it is possible to output the amount of electric power from the battery, avoiding a change of the operation point of the engine and, if it is determined that that it is impossible to output the amount of electric power from the battery, executing a control to change the operation point of the engine.

18. The control method according to claim 13, further comprising executing a returning control to resume a torque of the first electric motor and a torque of the engine corresponding to the operation point of the engine set prior to the shifting based on the state of the battery after the shifting of the stepped transmission has ended.

19. The control method according to claim 18, further comprising:
   calculating an electric power consumption that is needed for the shifting to be performed; and
   determining whether it is possible to output the amount of electric power from the battery, wherein, if it is determined that it is possible to output the amount of electric power from the battery, avoiding a change of the operation point of the engine and, if it is determined that it is impossible to output the amount of electric power from the battery, executing a control to change the operation point of the engine.

20. The control method according to claim 13, wherein, in changing the operation point of the engine, executing a control so to change an engine torque without changing an engine rotation speed.

21. The control method according to claim 20, further comprising:
   calculating an electric power consumption needed for the shifting to be performed; and
   determining whether it is possible to output the amount of electric power from the battery, wherein, if it is determined that it is possible to output the amount of electric power from the battery, avoiding a change of the operation point of the engine and, if it is determined that that it is impossible to output the amount of electric power from the battery, executing a control to change the operation point of the engine.

22. The control method according to claim 13, further comprising:
   calculating an electric power consumption that is needed for the shifting to be performed; and
   determining whether it is possible to output the amount of electric power from the battery, wherein, if it is determined that it is possible to output the amount of electric power from the battery, avoiding a change of the operation point of the engine and, if it is determined that that it is impossible to output the amount of electric power from the battery, executing a control to change the operation point of the engine.

23. The control method according to claim 13, wherein calculating the amount of increase/decrease in the charge amount of the battery is conducted according to electricity consumption necessary for a torque change of the second electric motor while the battery balance control means is to change a first electric motor electricity amount by changing the engine operation point based on the amount of increase/decrease in the charge amount of the battery.

24. The control method according to claim 13, wherein:
   the operation point of the engine is set to achieve a best fuel economy state for the engine against a requested driving force,
   an electric power amount of the first motor and the second motor is determined based on the operation point of the engine and the requested driving force,
   calculating the amount of increase/decrease in the charge amount of the battery is conducted according to electricity consumption necessary for a torque change of the second electric motor during the shifting, and
   the operation point of the engine changes when it is able to output the electric power amount required during a shifting from the battery, based on a state of the battery and the calculated amount of increase/decrease in the charge amount.

25. A control apparatus of a hybrid vehicle, comprising:
   a first drive unit that includes a first electric motor and a power distribution device that outputs driving force to a driving wheel via a differential device using an engine and the first electric motor and without using a stepped transmission;
   a second drive unit that includes a second electric motor and a stepped transmission disposed between the second electric motor and the driving wheel;
   a battery capable of both supplying electric power to the first electric motor and the second electric motor and storing electric power regenerated by the first electric motor and the second electric motor;
   a shift determination element that determines whether there is a need for shifting carried out by the stepped transmission;
   a battery state detection element that detects a state of the battery;
   a shifting-time drive control element that controls driving force output from the second drive unit so that driving force output from the first drive unit and the second drive unit to the driving wheel substantially reaches a driver request torque; and
   a battery balance control element that calculates an amount of increase/decrease in a charge amount of the battery in accordance with the state of the battery detected by the battery state detection element and changes an operation point of the engine based on the amount of increase/decrease in the charge amount, prior to the shifting of the stepped transmission, if the shift determination element determines that there is a need for the shifting of the stepped transmission, wherein:
   the battery balance control element calculates an electric power consumption that is needed for controlling the driving force from the second drive unit during the shifting at a time of determining that there is the need for the shifting, calculates the amount of increase/decrease in the charge amount of the battery in accordance with the state of the batten and the calculated electric power consumption of the second drive unit, and changes the operation point of the engine based on the amount of increase/decrease in the charge amount prior to the shifting if it is determined that it is impossible to output the amount of electric power from the battery.

26. The control apparatus according to claim 25, wherein calculating the amount of increase/decrease in the charge amount of the battery is conducted according to electricity consumption necessary for a torque change of the second electric motor while the battery balance control means is to change a first electric motor electricity amount by changing the engine operation point based on the amount of increase/decrease in the charge amount of the battery.

27. The control apparatus according to claim 25, wherein:
   the operation point of the engine is set to achieve a best fuel economy state for the engine against a requested driving force,
   an electric power amount of the first motor and the second motor is determined based on the operation point of the engine and the requested driving force,
   calculating the amount of increase/decrease in the charge amount of the battery is conducted according to electricity consumption necessary for a torque change of the second electric motor during the shifting, and
   the battery balance control element changes the operation point of the engine when it is able to output the electric power amount required during a shifting from the battery, based on a state of the battery and the calculated amount of increase/decrease in the charge amount.

* * * * *